US012566640B2

(12) United States Patent
Hanel et al.

(10) Patent No.: US 12,566,640 B2
(45) Date of Patent: Mar. 3, 2026

(54) ALLOCATING OF COMPUTING RESOURCES FOR APPLICATIONS

(71) Applicant: Capital One Services, LLC, McLean, VA (US)

(72) Inventors: Carson Hanel, Bryan, TX (US); Sean Gorsky, Somerville, MA (US); Erica Lin, Cambridge, MA (US); Suraj Bramhavar, Arlington, MA (US); Jeffrey Chou, Boston, MA (US)

(73) Assignee: Capital One Services, LLC, McLean, VA (US)

( * ) Notice: Subject to any disclaimer, the term of this patent is extended or adjusted under 35 U.S.C. 154(b) by 652 days.

(21) Appl. No.: 17/841,552

(22) Filed: Jun. 15, 2022

(65) Prior Publication Data
US 2023/0004440 A1 Jan. 5, 2023

Related U.S. Application Data

(60) Provisional application No. 63/212,046, filed on Jun. 17, 2021, provisional application No. 63/212,048, filed on Jun. 17, 2021.

(51) Int. Cl.
*G06F 9/50* (2006.01)
*G06F 9/48* (2006.01)

(52) U.S. Cl.
CPC .......... *G06F 9/5055* (2013.01); *G06F 9/4887* (2013.01)

(58) Field of Classification Search
CPC ................. G06F 9/5055; G06F 9/4887; G06F 2209/5019; G06F 2209/505; G06F 2209/508
See application file for complete search history.

(56) References Cited

U.S. PATENT DOCUMENTS

| | | | |
|---|---|---|---|
| 10,466,723 B2 | 11/2019 | Goto | |
| 2007/0110094 A1 | 5/2007 | Tobita | |
| 2012/0060142 A1 | 3/2012 | Fliess | |
| 2016/0179562 A1 | 6/2016 | Kaneko | |
| 2019/0236317 A1 | 8/2019 | Simonson | |
| 2019/0278610 A1 | 9/2019 | Tatsumura | |
| 2019/0342379 A1* | 11/2019 | Shukla .................. G06F 16/219 |
| 2020/0042352 A1* | 2/2020 | Breitgand ............... H04L 47/83 |

OTHER PUBLICATIONS

Alexander Tesch, Compact MIP Models for the Resource-Constrained Project Scheduling Problem, Jun. 2015. pp. 1-118.
Ercsey-Ravasz et al., Optimization Hardness as Transient Chaos in an Analog Approach to Constraint Satisfaction, Nature Physics, vol. 7, Dec. 2011, pp. 966-970.
Molnar et al., A Continuous-Time MaxSAT Solver with High Analog Performance, Nature Communications, 2018, pp. 1-12.
Vadlamani et al., Physics Successfully Implements Lagrange Multiplier Optimization, Oct. 27, 2020, vol. 117, No. 43, pp. 26639-26650.

(Continued)

*Primary Examiner* — Dong U Kim
(74) *Attorney, Agent, or Firm* — Banner & Witcoff, Ltd.

(57) ABSTRACT
A method for performing scheduling includes extracting information from at least one log file for an application. The method also includes determining an allocation of cloud resources for the application based on the information from the log file(s).

17 Claims, 14 Drawing Sheets

100

(56) References Cited

OTHER PUBLICATIONS

Xu et al., DAG-Aware Joint Task Scheduling and Cache Management in Spark Clusters, 2020 IEEE International Parallel and Distributed Processing Symposium (IPDPS), pp. 378-387.

Yin et al., An Analog SAT Solver Based on a Deterministic Dynamical System, 2017 Association for Computing Machinery. ICCAD'17, Nov. 2017.

\* cited by examiner

100

200

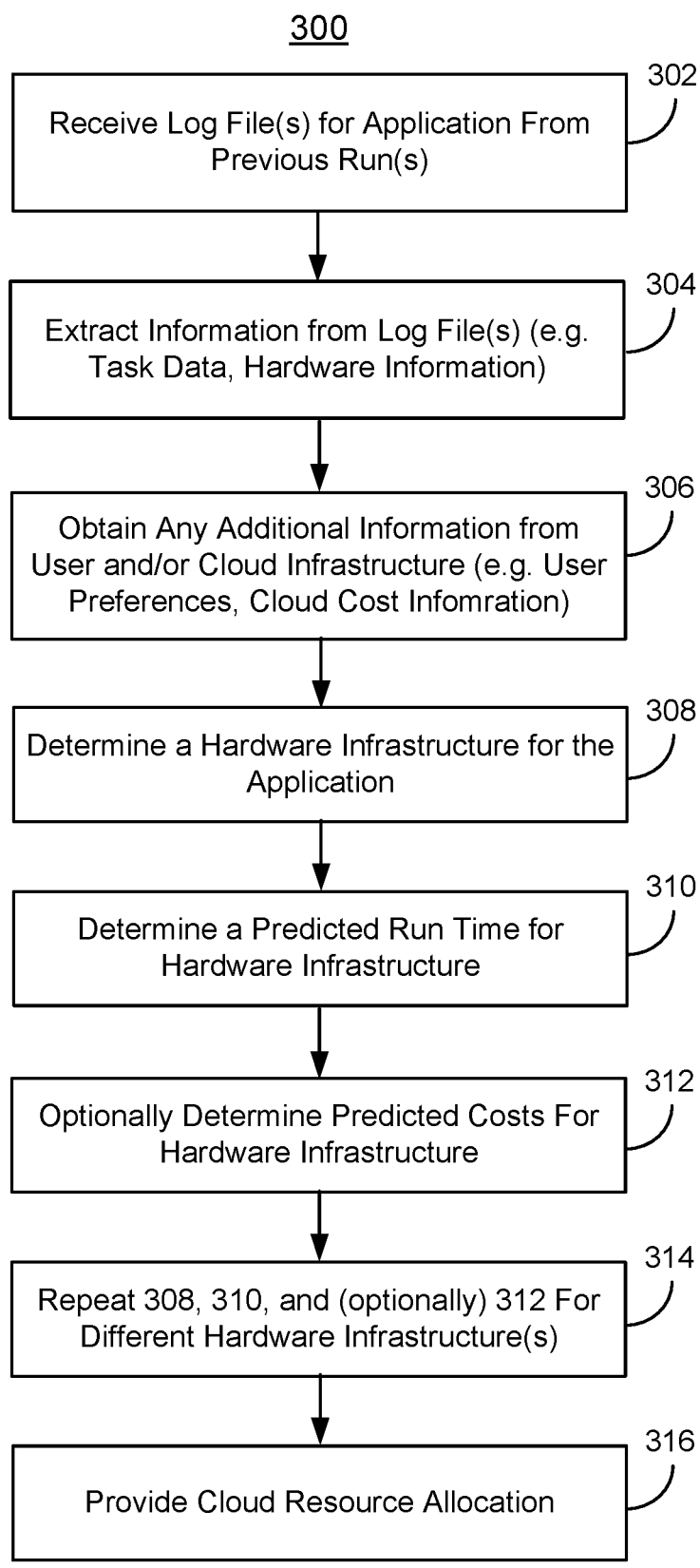

300

Receive Log File(s) for Application From Previous Run(s)          302

Extract Information from Log File(s) (e.g. Task Data, Hardware Information)          304

Obtain Any Additional Information from User and/or Cloud Infrastructure (e.g. User Preferences, Cloud Cost Infomration)          306

Determine a Hardware Infrastructure for the Application          308

Determine a Predicted Run Time for Hardware Infrastructure          310

Optionally Determine Predicted Costs For Hardware Infrastructure          312

Repeat 308, 310, and (optionally) 312 For Different Hardware Infrastructure(s)          314

Provide Cloud Resource Allocation          316

402 — Determine Total Dead Time for Each Stage

402 — Determine Total Task Time for Each Stage

406 — Account for Parallelism (Redistribute Task Time and Dead Time Based on Expected Active Cores) and/or Scaling 408 — Determine Predicted Makespan for Application

600

700

800

802

Determine Predicted Cost for Each Hardware Infrastructure

804

Determine Predicted Cost Versus Predicted Run Time

806

Determine Cloud Resources to be Used Based on Predicted Cost and Predicted Run Time

1200

1300

ALLOCATING OF COMPUTING RESOURCES FOR APPLICATIONS

CROSS REFERENCE TO OTHER APPLICATIONS

This application claims priority to U.S. Provisional Patent Application No. 63/212,046 entitled DYNAMIC ADJUSTMENT OF RESOURCES UTILIZING LOG FILES filed Jun. 17, 2021 and to U.S. Provisional Patent Application No. 63/212,048 entitled AUTOPROVISIONING CLOUD RESOURCES FOR APPLICATIONS filed Jun. 17, 2021, both of which are incorporated herein by reference for all purposes.

BACKGROUND OF THE INVENTION

One of the challenges of cloud computing is tackling the hundreds of different hardware configurations and settings a user can select when running their application. The consequences of a poor selection can lead to long run times and significant cloud computing costs. Both longer run times and larger costs are significant issues for users of a cloud infrastructure. A user could test run their application on all possible different instances of the cloud infrastructure using all possible combinations of settings and select the configuration which provides the lowest cost and runtime. This manual operation would be impractical as running the tests would cost more than running the actual application with sub-optimal settings and may require a significant amount of time to complete the tests. Accordingly, an improved mechanism for selecting a cloud infrastructure and, therefore provisioning resources for an application executed on the cloud infrastructure are desired.

BRIEF DESCRIPTION OF THE DRAWINGS

Various embodiments of the invention are disclosed in the following detailed description and the accompanying drawings.

FIG. 3 is a flow-chart depicting an embodiment of a method for automatically provisioning resources.

DETAILED DESCRIPTION

Figure 1:
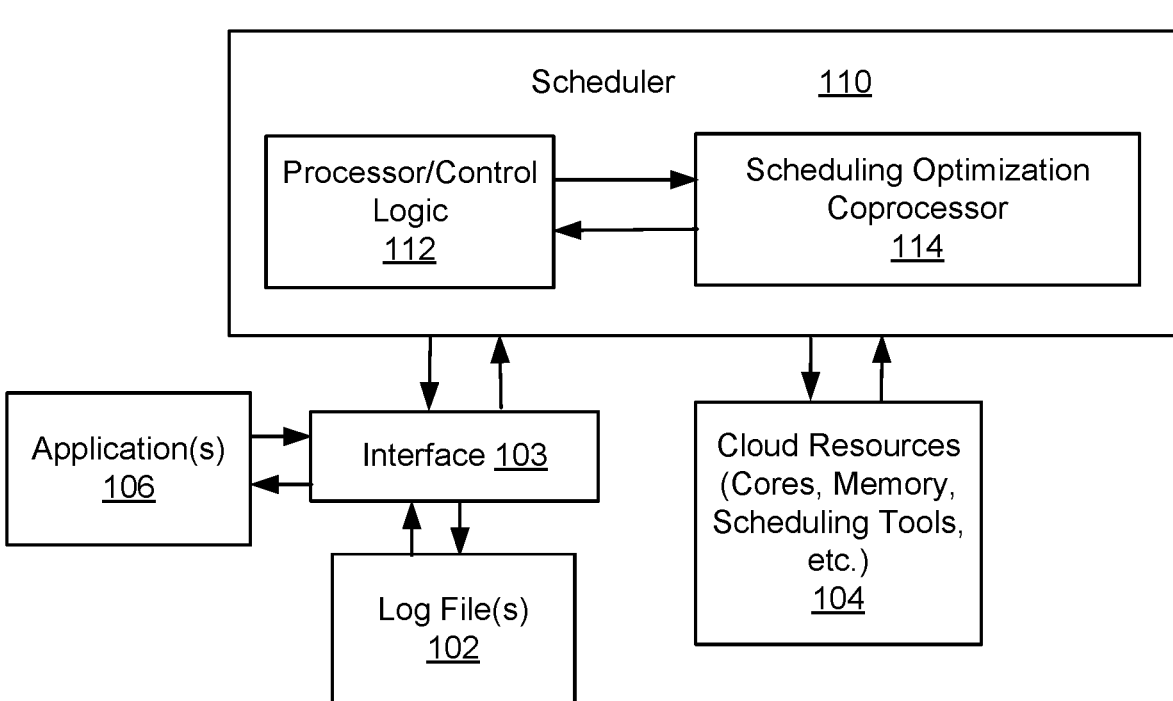
FIG. 1 depicts an embodiment of a computing system architecture utilizing a special purpose optimization processor for automatically provisioning resources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When running an application using cloud resources, a user is allowed to select from a number of different hardware configurations and settings. Based on these settings, cloud resources are allocated to processing the application. The consequences of a poor selection can lead to long run times and significant cloud computing costs. A user could manually test run their application on all possible instances of the cloud infrastructure using all possible combinations of settings. The user may then select the configuration which provides the lowest cost and/or run time. However, this technique for allocating resources is highly inefficient. As a result, most users simply choose the characteristics of the cloud infrastructure they believe may be appropriate and accept the consequences in run time and/or cost. Thus, processing in the cloud infrastructure may inefficiently utilize cloud resources, require larger times to complete a workload, consume more power than necessary, and result in the user incurring significant unnecessary financial costs.

Further, scheduling for compute jobs (i.e. applications, each of which includes multiple tasks to be performed) to available processing, network, memory and disk resources (e.g. in the cloud) is an NP-hard optimization problem. Solving for the scheduling in an optimal/close-to-optimal fashion may take an extremely long time. This may lead to latency degradation, wasted resources, and high cost. Consequently, simple scheduling mechanisms are typically used. For example, some cloud computing systems split an application into resilient distributed dataset (RDD) objects and build a directed acyclic graph (DAG) from the RDD objects. A DAG scheduler splits the DAG into stages of tasks, which are submitted as each stage becomes ready. A task scheduler launches the tasks in a cluster (e.g. a set of cloud computing cores, or nodes) having parameters selected by the user. The nodes execute the tasks for the stages. Although utilizing the resources of the cloud and selections of the user, this scheduling may be inefficient. For example, various aspects of each application, interactions between applications, interactions between stages, and interactions between tasks may not be accounted for. Thus, although automated scheduling of tasks for a compute job is performed, it may result in a sub-optimal use of computing resources. This may lead to poor performance, longer times to complete a compute job, and higher power consumption. Consequently, techniques for improving the allocation of resources in computing systems such as cloud computing systems are desired.

A method for allocating resources and performing scheduling for an application is described. The method includes extracting information from at least one log file for the application. In some embodiments, the log file(s) correspond to a single run of the application. The information extracted may include task data, cloud settings, hardware information, cloud economic information and/or cloud reliability information. The method also includes determining an allocation of cloud resources for the application based on the information from the log file(s). For example, the allocation of the cloud resources may include determination of a number of cores in a cluster for the cloud resources allocated to the application. The allocation of cloud resource may also include determining the scheduling of tasks and stages in some embodiments. Similarly, a system for provisioning cloud resources is described. The system includes processor(s) and memory. The memory is coupled to the processor and configured to provide the processor with instructions. The processor(s) are configured to extract information from log file(s) for the application and determine an allocation of cloud resources for the application based on the information from the log file(s). A computer program product embodied in a non-transitory computer readable medium is also described. The computer program product includes computer instructions for extracting information from log file(s) for the application and determining an allocation of cloud resources for the application based on the information from the log file(s).

FIG. 1 depicts an embodiment of computing system architecture 100 for performing scheduling for one or more application(s) 106. For clarity, not all components are shown. In some embodiments, different and/or additional components may be present. In some embodiments, some components might be omitted. System 100 includes scheduler 110, interface 103, and cloud resources 104. Also shown are applications 106 desired to be run using cloud resources 104 and log file(s) 102. In some embodiments, information from the application is sent to the interface, including application meta data. For example, application meta data can include information about the input data size, schema, file type, skew, or user submitted information. Application metadata can also include information related to the code, ecosystem, or platform submitted by the user. Scheduler 110 includes processor(s) and/or control logic 112 and scheduling optimization coprocessor(s) (SOC) 114. In some embodiments, scheduler 110 may also include memory (not shown). Processor 112 may simply be control logic, an FPGA, a CPU and/or a GPU used in controlling SOC 114. In some embodiments, processor(s) 102 might be omitted. Similarly, although a single SOC 114 is shown, in some embodiments, scheduler 110 may include multiple SOCs 114.

This application is related to co-pending U.S. patent application Ser. No. 16/847,140 entitled OPTIMIZATION PROCESSING UNIT HAVING SUBUNITS THAT ARE PROGRAMMABLY AND PARTIALLY CONNECTED filed Apr. 13, 2020, which is incorporated herein by reference for all purposes. This application is related to co-pending U.S. patent application Ser. No. 17/387,294 entitled OPTIMIZATION PROCESSING UNIT UTILIZING DIGITAL OSCILLATORS filed Jul. 28, 2021, which is incorporated herein by reference for all purposes. This application is related to co-pending U.S. patent application Ser. No. 17/402,432 entitled REAL TIME SCHEDULING USING EXPECTED APPLICATION RESOURCE USAGE filed Aug. 13, 2021, which is incorporated herein by reference for all purposes. In some embodiments, scheduler 110 and/or SOC 114 may be provided utilizing the techniques in the above-identified co-pending patent applications.

Cloud resources 104 may include one or more servers (or other computing systems) each of which includes multiple cores, memory resources, disk resources, networking resources, schedulers, and/or other computing components used in implementing tasks for executing application(s) 106. In some embodiments, for example, cloud resources 104 may include a single server (or other computing system) having multiple cores and associated memory and disk resources. Interface 103 receives the application(s) 106 to be executed and log file(s) 102. Application(s) 106 include one or more applications each of which includes multiple tasks to be performed by cloud resources 104.

Log file(s) 102 may be generated when the application(s) 106 are run (e.g. test run) on cloud resources 104. In some embodiments, the application(s) 106 may be run through scheduler 110 without scheduler 110 attempting to allocate resources or with scheduler 110 utilizing default or user-selected settings. In some embodiments, the application(s) 106 may be provided to cloud resources 104 in another manner. Thus, cloud resources 104 may use internal scheduler(s) (not explicitly shown in FIG. 1) to complete the tasks for the application(s) 106 during the test run. In doing so, log file(s) 102 are generated.

Scheduler 110 receives information about application(s) 106 and information about cloud resources 104. In some embodiments, scheduler 110 receives at least some of this information from log file(s) 102. More specifically, scheduler 110 extracts information from the log file(s) 102. In some embodiments, one log file 102 is generated for each time a particular application is run on cloud resources 104. Thus, scheduler 110 may extract the information from log file(s) 102 corresponding to a single run of each application 106. This information from log file(s) 102 is used in provisioning resources for the application(s) 106. For example, scheduler 110 may implement a parser for receiving and extracting information from a log file and a predictor for determining the resulting run time for an application based on the information extracted from the log file(s) 102. Thus, based on the information in the log file(s) 102, scheduler 110 provisions cloud resources 104 of the application.

Scheduler 110 may optimize completion of the tasks for application(s) 106 by cloud resources 104 without requiring multiple runs of application(s) 106. Thus, scheduling of tasks for application(s) 106 may be significantly more efficient. Scheduler 110 may also optimize the processing for application(s) 106. For example, the scheduling of tasks, stages (units of execution for multiple tasks in, for example, APACHE SPARK™), and/or different compute jobs (e.g. different application(s) 106) may be improved. Thus, the time taken to complete workloads for application(s) 106 may be reduced, the resources utilized (e.g. the number of cores used) may be better matched to the workloads and/or the cost of completing application(s) 106 may be reduced. Thus, performance of system 100 and use of cloud resources 104 may be enhanced.

Figure 2:
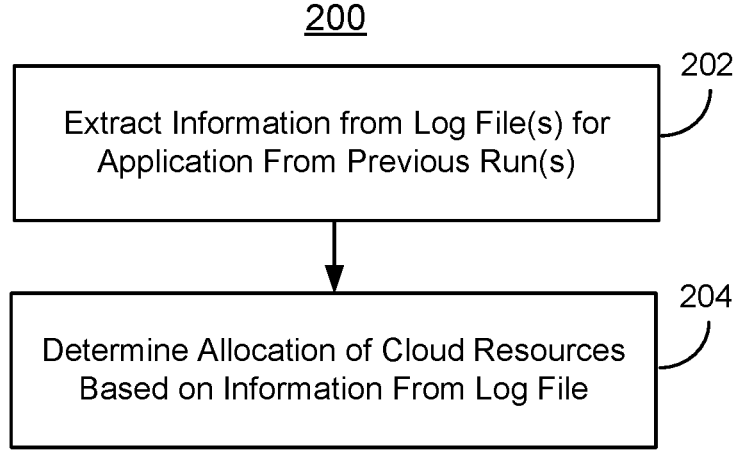
FIG. 2 is a flow-chart depicting an embodiment of a method for automatically provisioning resources.

FIG. 2 is a flow-chart depicting an embodiment of a method for automatically provisioning resources. Method 200 may be used in conjunction with system 100. However, in other embodiments, method 200 may be utilized with other systems. Although certain processes are shown in a particular order for method 200, other processes and/or other orders may be utilized in other embodiments. Method 200 is also described in the context of allocating resources for a single application. In some embodiments, resources for multiple applications may be allocated. In such embodiments, interactions between applications that are to be processed at overlapping times may be considered by method 200.

Method 200 starts after one or more log files for an application have already been generated. Thus, method 200 starts after the application has been run at least once. During processing for an application, a log file is typically generated by the cloud resources used. In some embodiments, the log file(s) for a single run of the application may be used in method 200. In general, one log file is generated for each time an application is processed. Thus, a single log file may be used in method 200. However, nothing prevents the use of multiple log files. As discussed above, cloud resources for the run of the application resulting in the log file may have been allocated using built-in schedulers, user selections related to cloud resources (e.g. the number of cores used), and/or other techniques. Thus, processing for the application may have been completed using settings for the cloud resources that are sub-optimal. Consequently, the log file used need not (and generally does not) include optimal resource allocation.

Information is extracted from the log file(s) for an application, at 202. In some embodiments, the information extracted may include task data and cloud settings. Task data relates to what the individual tasks for the application are and how each task is scheduled. For example, the time take to complete a specific task, how much data was provided for the task, and how much data was generated by the task may be identified. The cloud settings relate to characteristics of the cloud service for which cloud resources are desired to be allocated. Some of these settings may be selected by the user. For example, cloud settings may include the number of cores used, data partitions, the memory for each core, and/or other settings (e.g. SPARK™ settings). Hardware information, cloud economic information and/or cloud reliability information may also be obtained at 202. Hardware information may be extracted from the log file and/or obtained other sources such as the user and/or public sites detailing the hardware configurations available for a particular cloud service. Hardware information may include the type and number of processing units, the type and size of memory, the network bandwidth and the disk bandwidth. Cloud economic information and/or cloud reliability information may be extracted from the log file and/or acquired from other sources (e.g. the user and/or public sites). Cloud economic information may include fixed prices (on-demand) or variable prices (spot instances), which vary daily and across geographical regions. Reliability information may include the general probability of failure for Spot instances.

The allocation of cloud resources for the application is determined based on the information from the log file(s), at 204. For example, the allocation of the cloud resources may include a number of cores in a cluster allocated to the application. In some embodiments, determining the allocation of the cloud resources includes determining a plurality of hardware infrastructures (e.g. a particular number of cores to be used) and determining a predicted run time for each of the hardware infrastructures based on the information extracted from the log file(s). Thus, the relationship between the predicted run time (the time taken to complete the tasks for the application) and features of the hardware infrastructure (e.g. the number of cores) may be identified. In some embodiments, a predicted cost for each of the hardware infrastructures is also determined at 204. In such embodiments, the relationship between the predicted cost versus the predicted run time for each of the hardware infrastructures can be ascertained. Based on the predicted run time and/or predicted cost, the cloud resources may be provisioned. In some embodiments, the provisioning is automatically performed. For example, the number of cores corresponding to the lowest run time (or the lowest run time within a particular range of costs) may be automatically selected. In some embodiments, a user desiring to have the application processed selects the hardware infrastructure based on information provided by method 200. For example, the relationship between predicted run time and predicted costs may be displayed to a user. In such embodiments, the user selects the hardware infrastructure based on the relationship. The user may select a hardware infrastructure configuration having a slightly longer run time for the application, but which is significantly lower in cost.

For example, scheduler 110 may extract information from log file(s) 102 for application(s) 106, at 202. In some embodiments, scheduler 110 employs a parser to analyze log file(s) 102 and obtain task data, cloud setting, hardware configuration information, cloud cost information, cloud reliability information and/other relevant information. In some embodiments, scheduler may obtain some of this information (e.g. cloud cost and/or reliability information) from other sources. Based on the information extracted, scheduler 110 allocates the resources, at 204. In some embodiments, scheduler 110 determines the predicted run time for various hardware infrastructures as part of 204. Scheduler 110 may also determine the predicted cost for the various hardware infrastructures. Scheduler 110 may thus determine the predicted run time versus predicted cost for application 106. Based on this information, the number of cores is allocated to the application at 204. This allocation may be made by scheduler 110 and/or via user selections made in response to additional information (e.g. predicted run time versus predicted costs for various hardware configurations) provided to the user by scheduler 110.

Thus, resources may be allocated for the application. Whether this is performed automatically or by the user taking into account information provided by method 200, the allocation of resources may be improved. The number of cores used and/or the scheduling of tasks for the application may be optimized. As a result, execution of the application may be more efficient. For example, run time and/or costs may be reduced. Power consumption may also be reduced (e.g. due to the reduction in run time). Further, the process of allocating resources may be made significantly more efficient. For example, the application need not be repeatedly run in order to determine an improved hardware infrastructure for the application. In some embodiments, method 200 may be completed in real time or close to real time. Thus, the time utilized in allocating resources may remain small. Thus, not only may the run time for the application be reduced, but the time taken to allocate resources for the application shortened. Consequently, performance and efficiency may be improved.

FIG. 3 is a flow-chart depicting an embodiment of method 300 for automatically provisioning resources. Method 300 may be used in conjunction with system 100. However, in other embodiments, method 300 may be utilized with other systems. Although certain processes are shown in a particular order, other processes and/or other orders may be utilized in other embodiments. Method 300 is also described in the context of allocating resources for a single application. In some embodiments, resources for multiple applications may be allocated. In such embodiments, interactions between applications that are to be processed at overlapping times may be considered by method 300. Method 300 starts after one or more log files for an application have already been generated. The log file(s) for the application may be generated in an analogous manner to that described with respect to FIGS. 1-2.

One or more log file(s) for the application to be processed are received, at 302. The log file(s) are analogous to those described in the context of method 200. In some embodiments, the user is prompted to upload the log file(s). In some embodiments, the user may upload the application and the log files are automatically generated using predetermined and/or other default settings. Information is extracted from the log file(s), at 304. In some embodiments, 304 is analogous to 202.

Additional information used in allocating resources and not present in the log file(s) is obtained, at 306. In some embodiments, 306 includes receiving user preferences. For example, the desired configurations of the virtual server instances may be requested and received from a user via an interface. Similarly, cost and/or reliability information may be obtained from a site for the cloud services. In some embodiments, 306 may be omitted if enough information is obtained from the log file(s). Thus, sufficient information to allocate resources may be obtained via 302, 304, and 306.

A hardware infrastructure for the application is determined, at 308. For example, the settings selected by the user or other information at 306 may be used. In some embodiments, 308 includes determining the number and type of cores to be used in a current iteration of modeling the workload for the application.

For the hardware infrastructure identified at 308, the predicted run time for the application is determined, at 310. The predicted run time (or predicted makespan) for the application is the total time required to process the workload for the application using the hardware infrastructure selected at 308. In some embodiments, the predicted runtime is determined by determining a total dead time (the amount of time a core spent not working tasks provided that it worked on at least one task) and the total task time (the time required to process all of the tasks for the application). In some embodiments, the total task time is scaled based upon the size of the data set, also at 310. In some embodiments, 310 also includes distributing the tasks for the application over multiple cores of the hardware infrastructure. Stated differently, the parallelism is accounted for. In some embodiments, the amount of parallelism in the log file(s) is used at 310. Thus, the distribution of tasks performed in parallel may be accounted for in the calculation of the predicted run time.

The predicted costs for the hardware infrastructure may be determined, at 312. In some embodiments, 312 is based on factors such as the run time, the cost per unit run time, and the number of cores utilized. In some embodiments, 308, 310, and 312 are repeated for other hardware infrastructures, at 314. Thus, the relationships between the hardware infrastructures, the predicted run times, and the predicted costs are determined. The hardware infrastructure, cloud settings, and other aspects of the cloud computing are determined and used to select the hardware infrastructure configuration, at 316. In some embodiments, 316 includes automatic allocation of the cloud resources, as discussed with respect to 204 of method 200. In some embodiments, 316 include providing information to the user to allow the user to better select the cloud settings, as discussed with respect to 204 of method 200. In some embodiments, 316 also include scheduling of tasks and stages.

For example, scheduler 110 may receive and extract information from log file(s) 102 for application(s) 106, at 302 and 304. In some embodiments, scheduler 110 employs a parser to analyze log file(s) 102 and obtain task data, cloud setting, hardware configuration information, cloud cost information, cloud reliability information and/other relevant information. Scheduler 110 may obtain some of this information (e.g. user settings, cloud cost and/or reliability information) from other sources, at 306. Based on the information extracted, scheduler 110 determines the predicted run times and, in some embodiments, the cost, at 310 and 312. At 316, scheduler 110 may allocate (i.e. assign or allow the user to select) cloud resources to application 106.

Thus, method 300 efficiently allocates cloud resources for the application. Whether this is performed automatically or by the user taking into account information provided by method 300, the allocation of resources may be improved. The number of cores used and/or the scheduling of tasks for the application may be optimized. As a result, execution of the application may be more efficient. For example, run time and/or costs may be reduced. Power consumption may also be reduced (e.g. due to the reduction in run time). Further, the process of allocating resources may be made significantly more efficient. For example, the application need not be repeatedly run in order to determine an improved hardware infrastructure for the application. Thus, not only may the run time for the application be reduced, but the time taken to allocate resources for the application shortened. Consequently, performance and efficiency may be improved.

Figure 4:
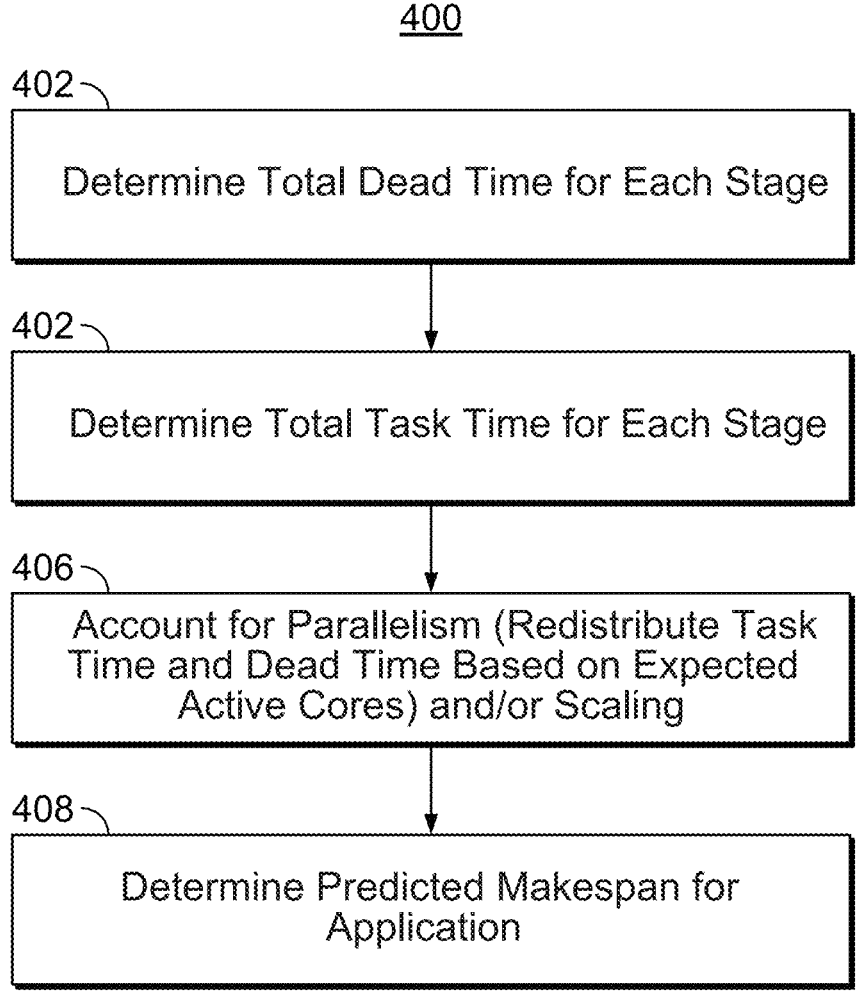
FIG. 4 is a flow-chart depicting an embodiment of a method for providing the predicted run time.

In some embodiments, the predicted run time for the application is determined based upon the tasks for the application and stages into which the tasks may be divided. A stage may include a number of tasks which are related or which have been grouped together for execution. FIG. 4 is a flow-chart depicting an embodiment of a method for providing the predicted run time based on stages. Although certain processes are shown in a particular order, other processes and/or other orders may be utilized in other embodiments. Method 400 is also described in the context of determining the predicted run time for a single application. In some embodiments, resources for multiple applications may be allocated. In such embodiments, interactions between applications that are to be processed at overlapping times may be considered by method 400. Method 400 may be used in conjunction with system 100 and methods 200 and/or 300. For example, method 400 may be used for performing 310 for each hardware infrastructure. In other embodiments, method 400 may be utilized with other systems and/or methods.

The total dead time for each stage is predicted, at 402. The total dead time includes the time each core used in executing tasks for the stage is not working on a task. The total dead time excludes the time a core is not working on executing tasks if the core is unused for the stage. The determination of the total dead time (i.e. the predicted total dead time for each stage) in 402 is accomplished using information extracted from the log file(s).

The total task time for each stage is also predicted, at 402. The total task time includes the total time required to complete the tasks from the start of the first task to the end of the last task for the stage. The determination of the total task time (i.e. the predicted total task time for a stage) at 404 is accomplished using information extracted from the log file(s). In some embodiments, the task time is based on a particular time taken for tasks indicated in the log file(s). In some embodiments, the task time may be predicted based upon other factors, such as data scaling.

Parallelism and scaling are accounted for at 406. In some embodiments, 406 is performed for the total dead time and the total task time as part of 402 and 404, respectively. Parallelism relates to the distribution of tasks based on the expected active cores. Stated differently, the tasks are not simply processed serially by a particular core. For example, if the number of tasks is less than the number of cores then there will be cores left unused by that stage. On the other hand, if there are more tasks than cores, then those tasks are spread across those cores. Scaling relates to the amount of data to be processed. For example, if the log file(s) correspond to a different amount of data than is expected to be processed by the application, the times may be scaled up or down. Thus, part of 406 may include profiling users' workload(s) and/or allowing a user to indicate the typical workload size.

The predicted makespan, or predicted total run time, for the application is determined, at 408. Based on the total task time and total dead time predicted, which may be scaled and parallelized, the predicted total stage run time for each stage is determined. The predicted total stage run time is used to provide the predicted total run time for the application.

Using method 400, the predicted run time may be determined for the application. This predicted run time may be used to determine the cloud resource allocation in method 200 and/or 300. Consequently, performance and efficiency may be improved.

In some embodiments, methods 200, 300, and/or 400 and system 100 may be used in connection with provisioning cloud resources for cloud services utilizing APACHE SPARK™. APACHE SPARK™ (also termed SPARK™ herein) is a popular data analytics platform used extensively today by many companies to process big data. Scheduler 110 and methods 200, 300, and/or 400 may be used to predict both the time duration and resources used to compute a Spark application. Thus, methods 200, 300, and/or 400 may be further explained in the context of allocating resources, including scheduling of tasks and stages, for a cloud service utilizing APACHE SPARK™. FIGS. 5-18 further describe embodiments of system 100 and methods 200, 300, and/or 400 in the context of APACHE SPARK™. However, the predictor works effectively for other platforms.

Using methods 200, 300, and/or 400 and system 100, users' workloads may be profiled and models utilized to predict an optimized cloud infrastructure to use. The prediction is generated substantially instantly (e.g. in real time), generally with no training required, due to its model-based process. The scheduler can also be tunable, based on the business needs of the customer. For example, a user may choose a longer runtime but for much lower costs, or they could choose the fastest runtime but at much larger costs—the final decision depends on the priorities of the individual users. The scheduler thus provides a solution to a growing and critical problem on the cloud.

In order to accurately predict the resources needed, the methods and systems described herein parse information from one or more SPARK™ log files, each of which is generated from a previous run. The log file contains information below which is extracted by scheduler 100 and/or methods 200, 300, and/or 400:

Task data—e.g. how long does it take to complete one of the tasks, how much data goes in, how much data is generated User/Cloud service settings—e.g. how many cores, different SPARK™ settings, data partitions, memory on each core Hardware information is collected on the public or cloud computing website which details the various hardware configurations such as type and number of CPUs, type and size of memory, disk bandwidth, and network bandwidth.

Cloud economic information may also be pulled from the cloud service's public website to extract fixed prices (on-demand) or variable prices (spot instances), which vary daily and across geographical regions.

Reliability information may also be also pulled from the public cloud service website, which lists the general probability of failure for Spot instances.

The methods 200, 300, and 400 and/or scheduler 110 take in a parsed event log with the application data described above and a set of driver and worker infrastructure hardware types to perform the prediction on. Thus, the log file for the application may be uploaded for use by scheduler 100 and/or methods 200, 300, and/or 400. The output is a cost-to-runtime prediction, which can be visualized as a curve, where each point on the curve represents a different hardware infrastructure.

SPARK™ applications are broken down into stages, where each stage can perform a set of transformations on partitioned data, and dependent stages do not begin until the previous stage has completed. In the context of SPARK™, scheduler 100 and/or methods 200, 300, and/or 400 may perform a stage-by-stage prediction, taking data specific to each stage, and calculating the predicted runtime of that particular stage on a specific hardware infrastructure. The total predicted application runtime is the sum of non-overlapping predicted runtime of individual stages and a predicted application overhead. The predicted application overhead includes time loading data from input data sources, such as files from AWS™ s3 buckets (or other analogous source), onto the cluster, and driver time in between stages.

Figure 5:
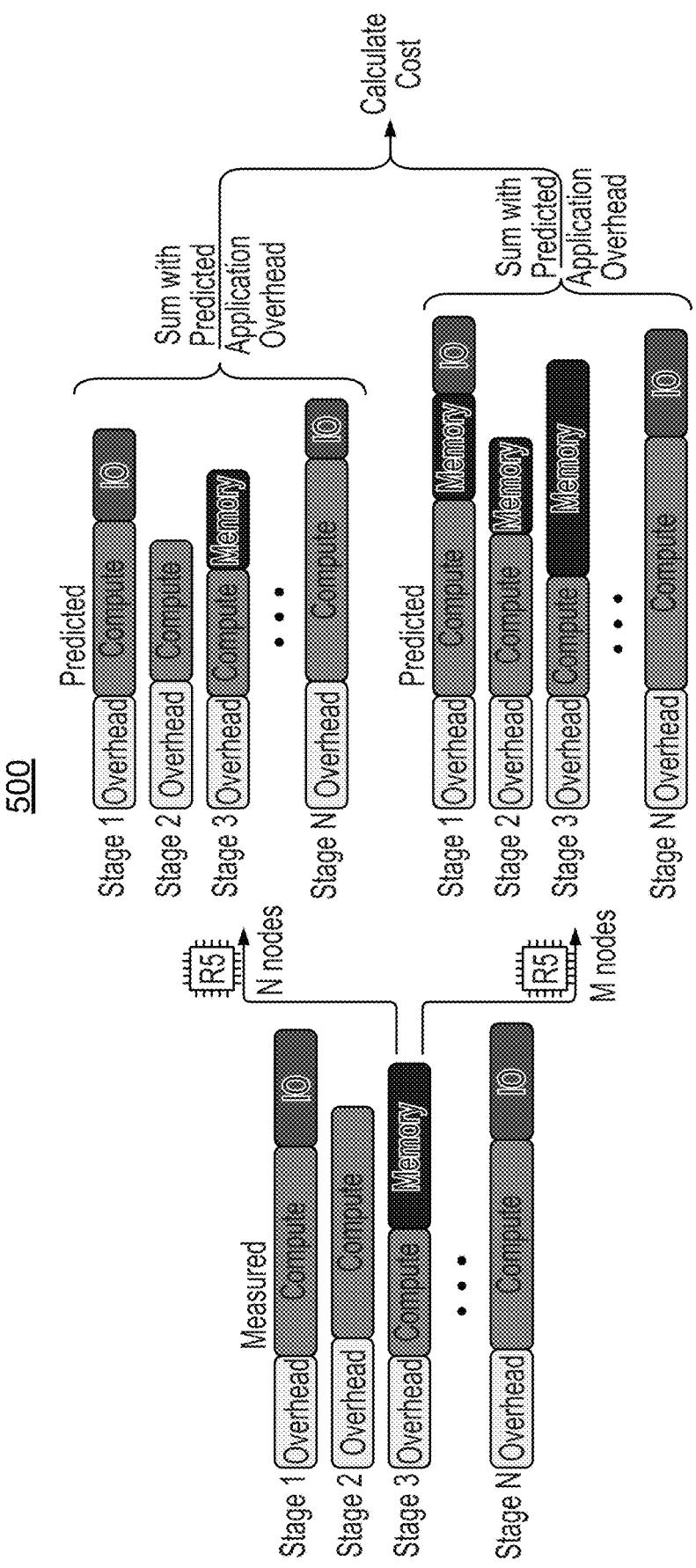
FIG. 5 illustrates an embodiment of how the measured stage information may be used to predict runs on different hardware node sizes (e.g. M and N).

For each stage, the compute time, overhead time, IO time, and memory time is calculated. Memory time is blocking time the application spends on memory management, including time spilling data from RAM to disk or evicting blocks from cache. The number of tasks is also calculated based on the desired input data size and relevant SPARK™ parameters. Using this information, the predicted runtime for each stage is calculated for a given number and type of nodes using a mathematical model as described below. FIG. 5 illustrates embodiment 500 of how the measured stage information may be used to predict runs on different hardware node sizes (e.g. M and N).

Prediction of an application's makespan (i.e. run time) when projected onto a new set of hardware is complicated. At the task level, an ideal prediction would use knowledge of the number of tasks and the duration of each task (or at least a distribution of task times). Prediction of task time utilizes knowledge of how each element that contributes to task time (overhead, compute, memory, etc.) change on a new set of hardware, and these relationships can be complicated. At the stage level, the possibilities of stage concurrency and stage dependency are accounted for. Data skew also presents a unique challenge, as the makespan of a stage with large skew can be dominated by just a small subset of the tasks. Accounting for all these elements and more may ultimately use task-level simulation of applications on different hardware. Scheduler 100 and/or method(s) 200, 300, and/or 400 may be extended to such simulations.

A coarse but surprisingly effective level of prediction can be achieved by restricting the scope of hardware changes and making some assumptions about how stage makespan scales with the hardware. At the core of this metric is the total task time, or the amount of core-time in each stage spent actively working (e.g. reading data, computing, etc.). This value is calculated by summing the duration of each task within a stage. The following restrictions and assumptions may be made in some embodiments:

Hardware class is fixed (e.g. the AWS™ m5._class);

Total task time is invariant to hardware changes (subclass or number of workers);

Total task time scales linearly with input data size;

No major data skew;

Stages are initiated sequentially, though they may run concurrently. The stage order is preserved from the input log.

Prediction of the application's run time begins by calculating the total task time and total dead time, where dead time is the amount of time a core spent not working tasks provided that it worked on at least one task. This time is distinct from unused cores which accounts for cores that did not receive any tasks. Dead time primarily exists only at the end of stages, when a core has no new tasks to work on while another core is still finishing a task. This value is larger for tasks more skew, where a small number of subset tasks may take a long time to finish on just a few cores.

If the stage reads in data from either disk or a shuffle, then the total task time is scaled linearly with the projected change in input data size. In other words, if the user is going to operate on a data set that is twice as large as the original, then total task time is also twice the original total task time. Across different hardware types, the total task time is considered invariant.

Figure 6:
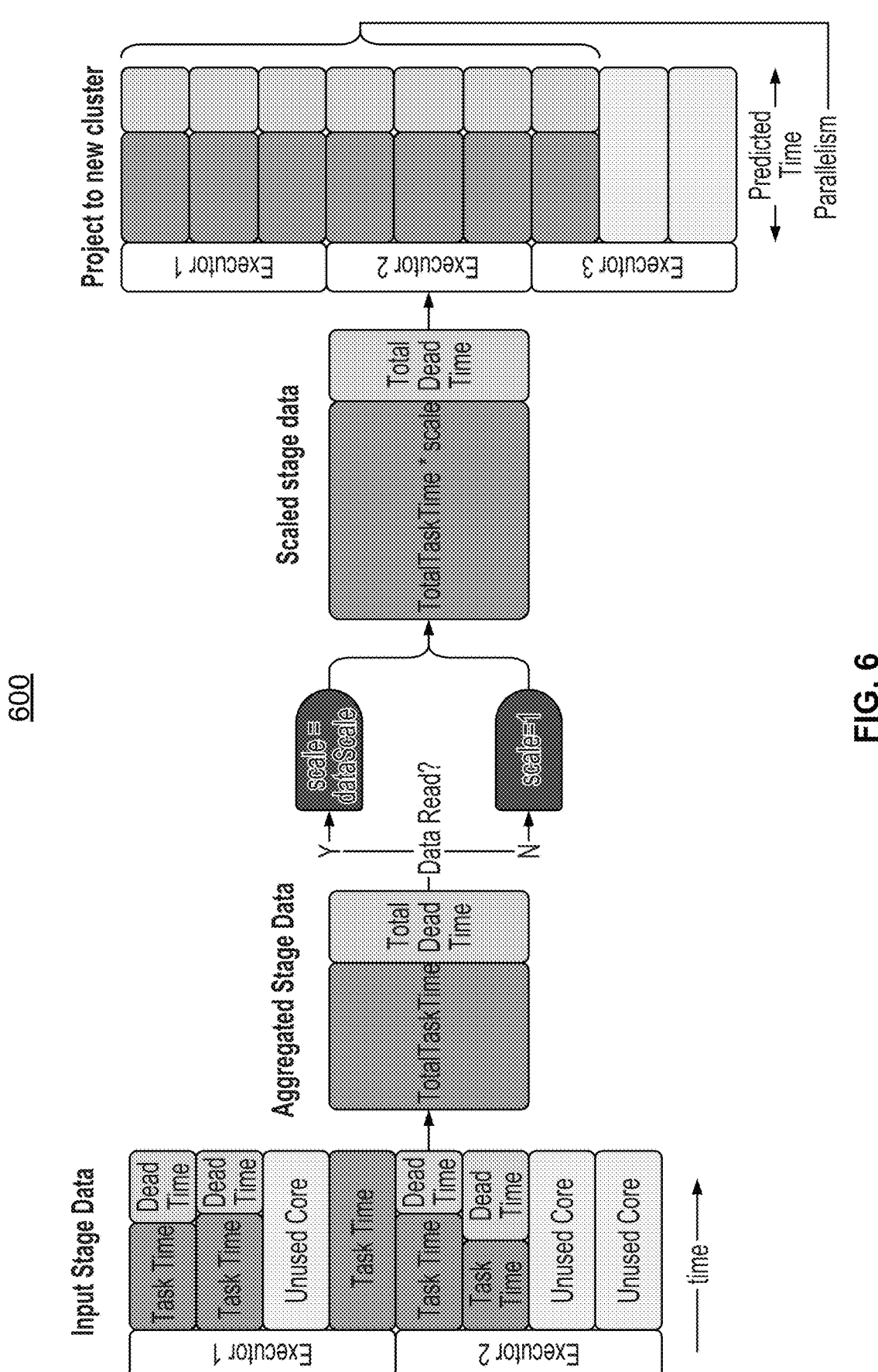
FIG. 6 depicts an embodiment of a coarse-grained runtime prediction for a single stage.

Finally, the scaled total task time and total dead time get redistributed across the number of expected active cores in the new cluster, here called the parallelism. In some embodiments, parallelism may be set equal to the minimum of either the total number of worker cores in the cluster or the predicted number of tasks for the stage. If the number of tasks is less than the number of cores, then there will be cores left unused by that stage. On the other hand, if there are more tasks than cores, then under the current assumptions those tasks will be spread evenly across those cores. FIG. 6 depicts an embodiment 600 of a coarse-grained runtime prediction for a single stage. In particular, input stage data related to the task time and dead time may be obtained from the log file(s). This data may be aggregated and scaled. The scaled data may be redistributed to a number of cores corresponding to the selected hardware configuration. This provides a predicted run time for the stage, as well as indicates the unused cores. This process can be written as:

$$\text{Total Dead Time} = (\text{Stage Time} - \text{Total Task Time}/\text{parallelism})$$

$$\textit{Pred} \text{ Stage Time} =$$

$$\frac{\text{data Scale} * \text{Total Task Time} + \text{Total Dead Time}}{\textit{pred} \text{ Parallelism}}$$

Here StageTime is the duration between the start of the first task and the end of the last task, dataScale accounts for changes in input data size, parallelism is the amount of parallelism in the input log, and predParallelism is the predicted amount of parallelism on the new set of hardware.

For runtime prediction of an entire application, the predicted stage runtimes are combined into a makespan. The simplest model will stitch the predicted runtimes together end-to-end, in which case the predicted application runtime is the sum of all predicted stage runtimes. In reality, there can exist concurrency in stages, this is the case if one stage does not fill all available cores at a given time and the subsequent stage has no unfulfilled dependencies. A method for accounting for these effects is described in the Task Simulation Based Predictor section.

Figures 7, 8:
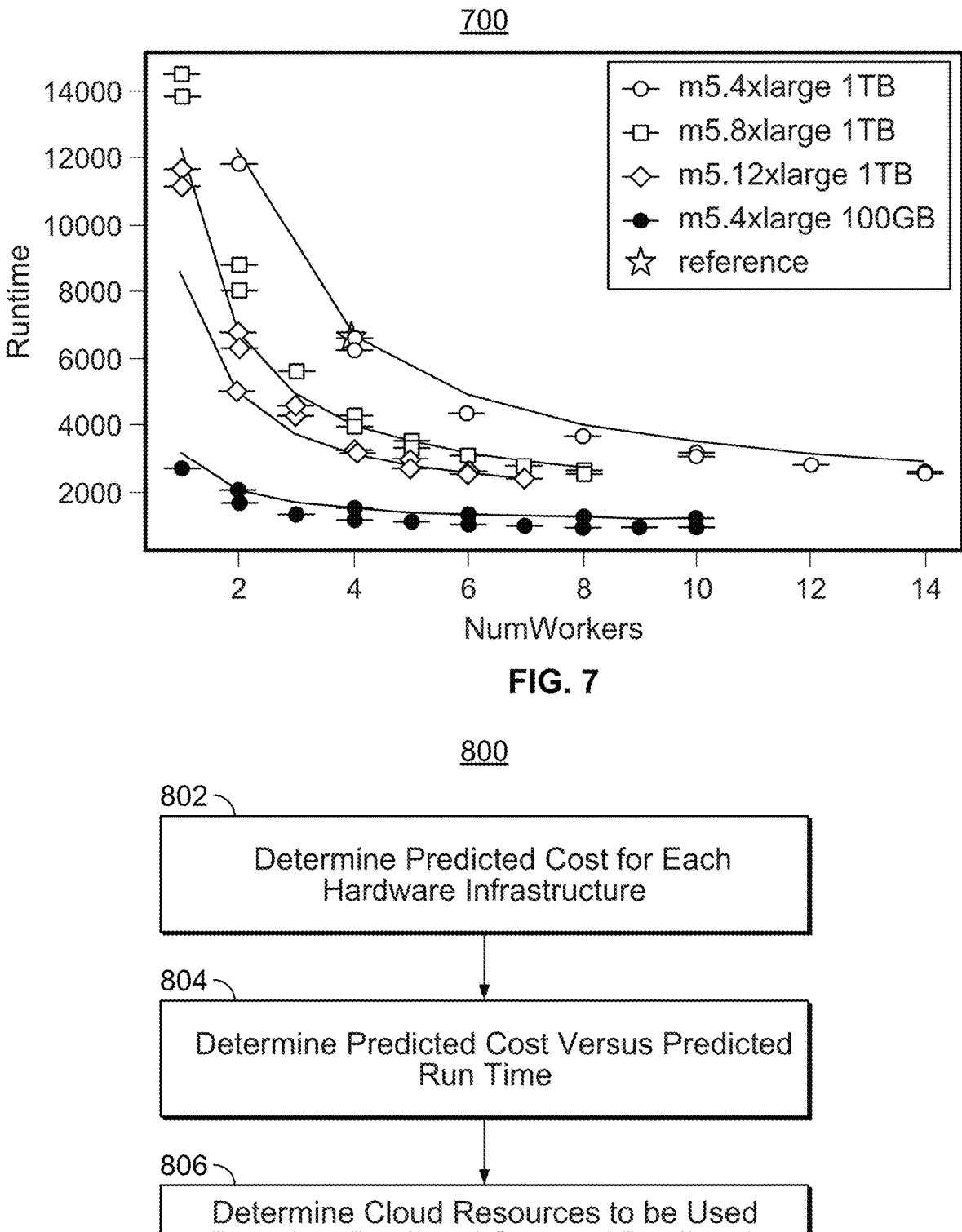
FIG. 7 depicts an embodiment of a graph of predicted run time versus number of nodes.
FIG. 8 is a flow-chart depicting an embodiment of a method for incorporating costs in allocating cloud resources.

The prediction model using end-to-end stage stitching was tested using a TPC-DS data set. FIG. 7 depicts an embodiment of graph 700 of predicted run time versus number of nodes The input log was from a run using 1 TB of data on a cluster with 4 m5.4×large workers and is indicated by the black star. This log was then projected onto different instance types, worker counts, and a different data size using scheduler 110 and/or method(s) 200, 300, and/or 400. In most cases the prediction is very close to the measured values, only consistently falling short when projecting onto a low number of workers.

In practice, one or more logs will be ingested by scheduler 110 and/or method(s) 200, 300, and/or 400 and then projected onto a set of potential instance types and numbers of nodes. The relevant set of instance types is determined by application characteristics (memory and compute requirements), user input (companies may wish to run on specific node types), available budget for the job, and availability (certain nodes are only available in certain regions). Then, for each hardware set and corresponding runtime prediction, the predicted cost is calculated using the mathematical model described herein.

Once cost and runtime predictions are complete, they are combined into cost-to-runtime curves upon which static cloud configuration optimization can be performed. Depending on the user preferences and particular application requirements, the optimization can be tuned to weight runtime, cost, or reliability appropriately and return a tailored optimal configuration for the user.

For example, FIG. 8 is a flow-chart depicting an embodiment of method 800 for incorporating costs in allocating resources. Method 800 is also described in the context of determining predicted costs for a single application. In some embodiments, costs for multiple applications may be determined. In such embodiments, interactions between applications that are to be processed at overlapping times may be considered by method 800. Method 800 may be used in conjunction with system 100 and methods 200 and/or 300. For example, method 800 may be used for performing 312 for the hardware infrastructures selected. In other embodiments, method 800 may be utilized with other systems and/or methods.

The predicted cost for each hardware infrastructure is determined, at 802. In some embodiments, 802 includes applying the cloud economic information to the predicted run time determined for each hardware infrastructure. For example, the costs per unit time and/or core may be applied to the run time and cores for the application and corresponding hardware infrastructure. The relationship between the predicted costs and the predicted run time may be identified and presented to the user, at 804. The cloud resources to be used for the application are determined based on the predicted costs and run time. Thus 806 is analogous to 316. In some embodiments, the user may select the desired cost and run time and the resources automatically allocated accordingly.

Figure 9:
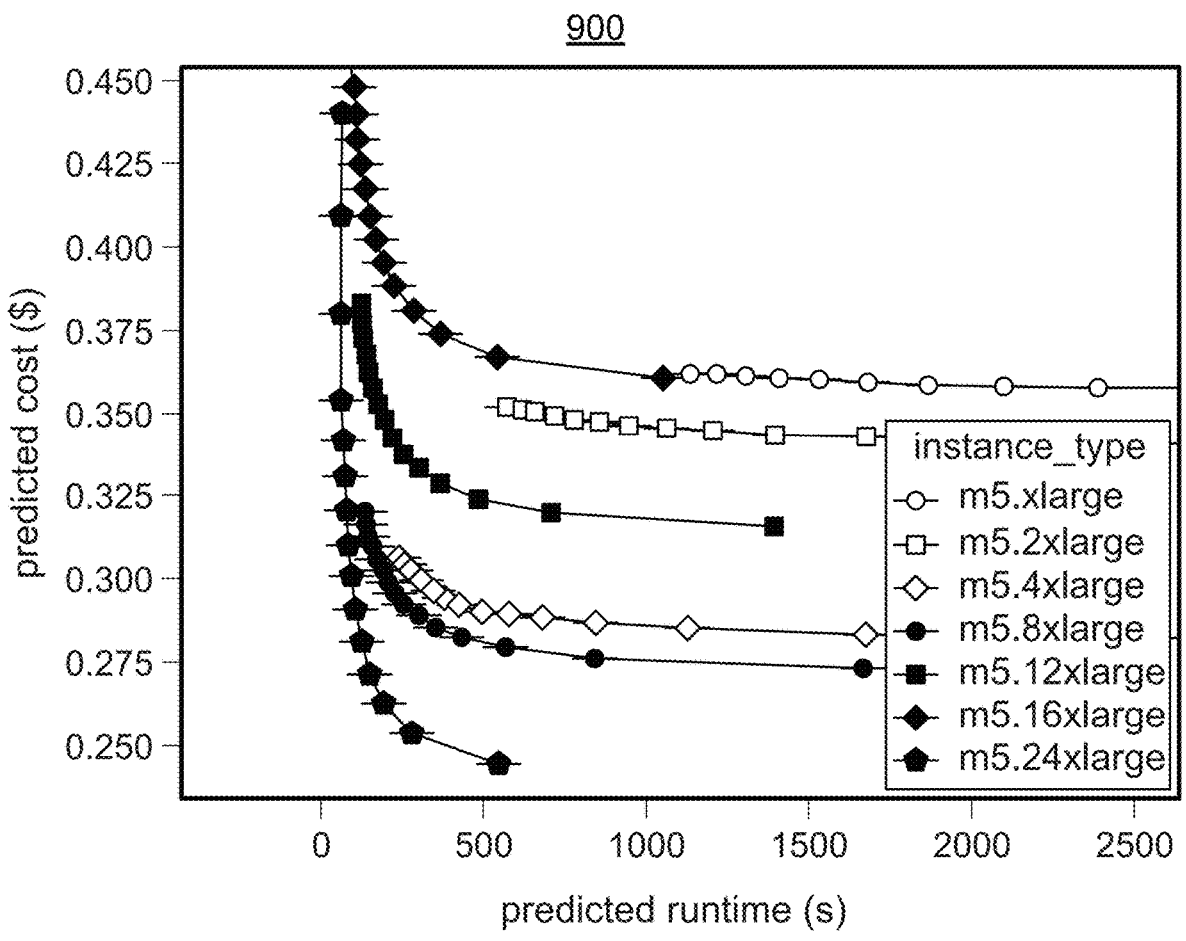
FIG. 9 depicts embodiments of the predicted cost and runtime of an application on seven different hardware infrastructures.

For example, FIG. 9 depicts an embodiment of the predicted cost-to-runtime curves of a single SPARK™ machine learning benchmark on just 7 different AWS™ instances (i.e. seven different hardware infrastructures). The different instance types are indicated by lines, and each point therein represents a different number of worker nodes. Scheduler 100 and/or method(s) 200, 300, 400, and/or 800 may quickly generate these curves to give both customers and deeper cost optimization models the critical information needed to make the proper decisions.

Figure 10:
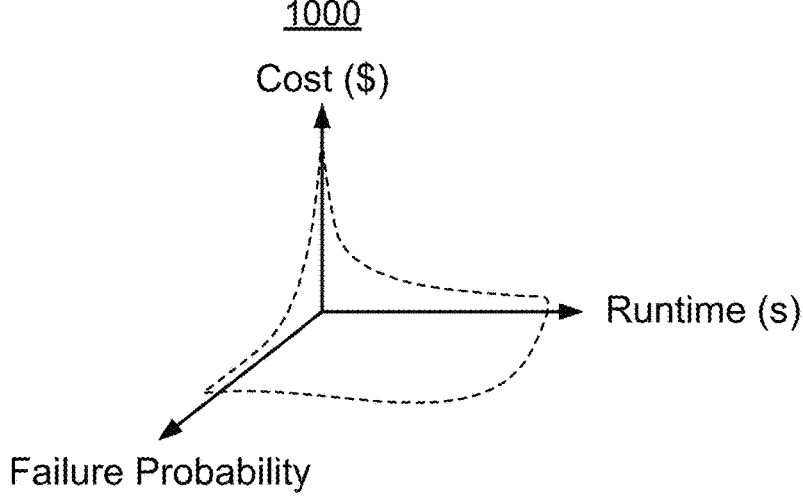
FIG. 10 is an embodiment of a graph indicating how failure probability may be incorporated.

Additional vectors can be added to the prediction(s) performed via methods 200, 300, 400, and/or 800 and/or scheduler 100, such as how reliability scales with the number of nodes, as indicated in FIG. 10. For example, on AWS™ spot instances, the probability of node failure is listed publicly. This information can be inserted into a 3rd axis to show "probability of node failure" as a function of cost and runtime.

To account for stage overlap in runtime prediction, a simulation of task placement may be performed. In this simulation, the total task time for a stage is placed in blocks onto available cores, starting with the maximum of the either earliest available core time or the time when all dependencies are fulfilled. If two or more consecutive stages do not fill all cores and do not have any unfilled dependencies, then they will be placed in blocks at the same time onto different cores. The total task time for a stage may be broken down into several blocks depending on how core availability changes during that stage's placement.

Figure 11:
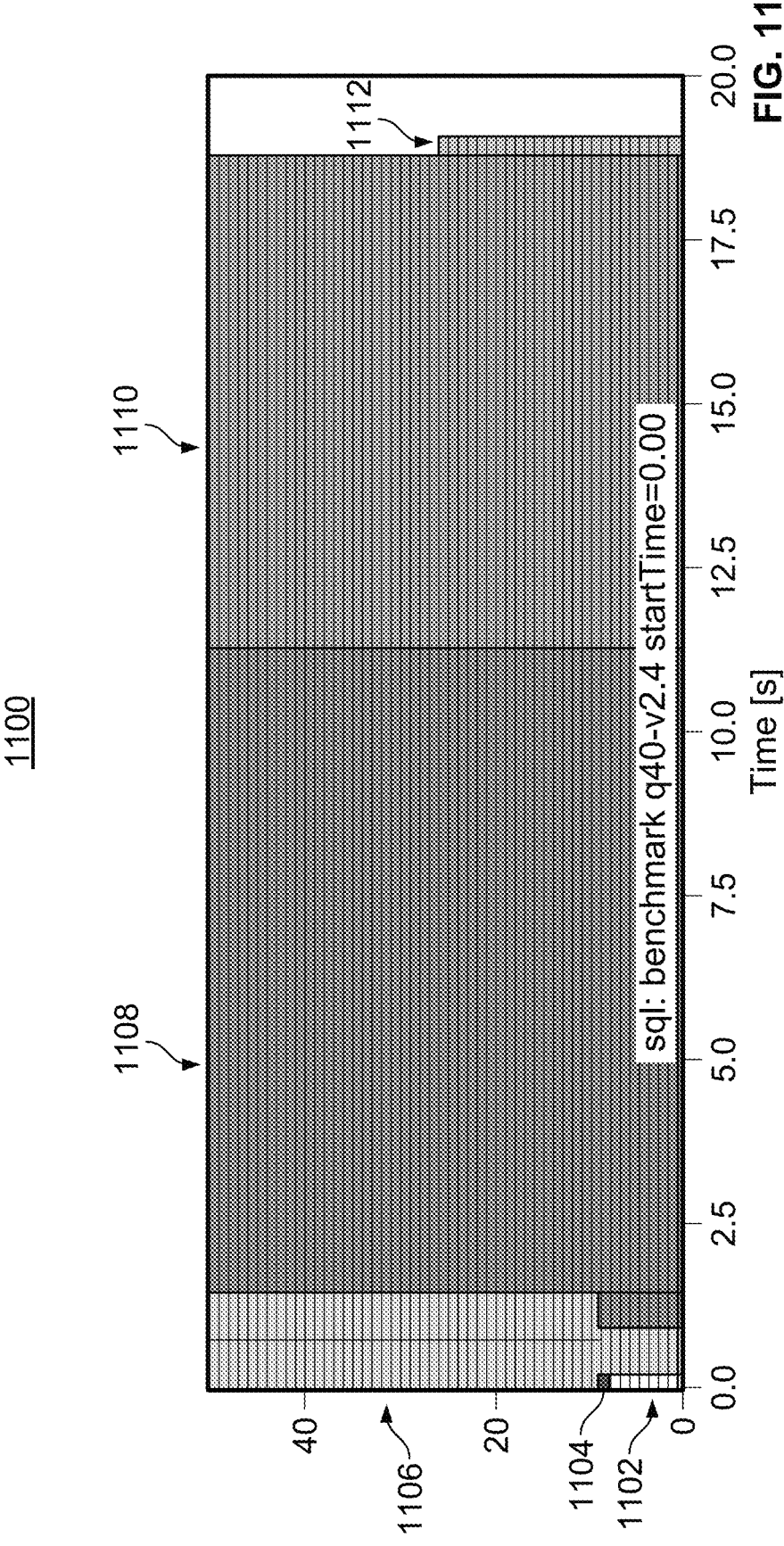
FIG. 11 depicts an example block simulation for coarse grained prediction.

FIG. 11 depicts an example block simulation 1100 for coarse grained prediction. Block simulation 1100 may be achieved from a TPC-DS query 40. The stages 1102, 1104, and 1106 (furthest left and bottom, second from left, third from left), are all able to start concurrently as they are the first three stages and there are no interdependencies between them. Stages 1106 and 1108 place their total task time in separate blocks according to the core availability. Specifically, stage 1108 first has a small block placed (~1 to 1.5 s) that overlaps with stage 1106, after which a second larger block is placed (~1.5 to 11 s) which represents the remainder of the total task time. The application is completed using stages 1110 and 1112

The prediction indicated in the embodiment shown in FIG. 11 neglects effects of individual task variance (e.g. stochastic variances or data skew), though it is computationally efficient. Another way to predict application run time would be to simulate the placement of individual tasks of varying length. This task-level simulation method is discussed further below.

Full simulation of a SPARK™ application is another method for predicting application run time on different hardware configurations that is usable by methods 200, 300, 400, and/or 800 and/or scheduler 100. A distribution of task times is predicted for each stage. A set of tasks is drawn from that distribution. The placement of all tasks from all stages onto executors is simulated.

Figure 12:
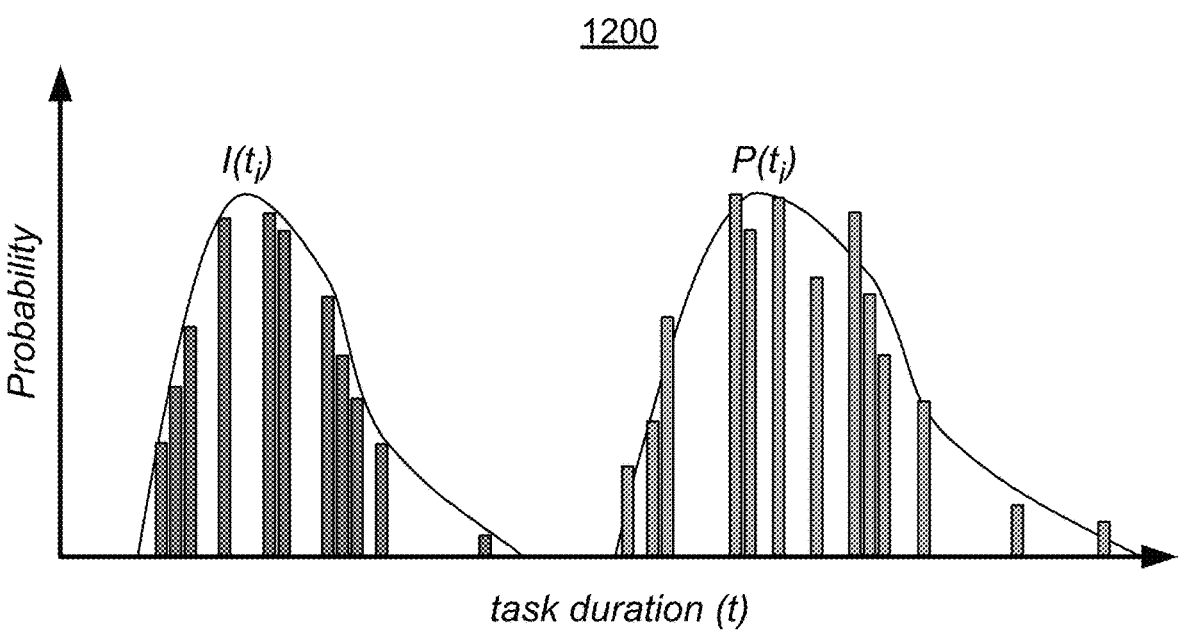
FIG. 12 depicts an embodiment of the prediction of task duration distribution on new hardware.

Predicting task distributions begins by calculating the discrete task distribution of each stage of the input log file(s). The task distribution of an individual stage is represented by $I(t_i)$, which describes the probability I of drawing a task of duration $t_i$ when drawing randomly from the set of tasks $\{t_i\}$. This is accomplished by creating a histogram of the task durations for each stage. It is then predicted how this distribution will change on a new set of hardware. A simple model for this prediction is one which preserves the shape of the input distribution but allows it to scale and shift according to the number of tasks and total duration of tasks on a new set of hardware. The predicted distribution is then given by:

$$P(t_i)=a*I(at_i+b)$$

where the coefficients a and b depend on the changes to the hardware. This process is depicted in FIG. 12, which shows an embodiment 1200 how the shape of the task distribution is preserved in the transformation to new hardware. The shape of the input distribution is informed by the set of input tasks (bars under $I(t_i)$) while the set of predicted tasks (bars under $P(t_i)$) are drawn from the predicted distribution $P(t_i)$.

A set of tasks is drawn from the predicted distribution. If it is predicted that there will be N tasks for a stage, then N tasks are (e.g. randomly) drawn from the predicted distribution $P(t_i)$. This random drawing process makes this a stochastic method, so it may be desirable to repeat the simulation multiple times to understand the statistical expectation for application runtime. In some embodiments, another mechanism for drawing tasks from the predicted distribution.

Once a set of tasks is generated for each stage, then the placement of these tasks onto executors is simulated. For a predicted set of hardware the set of cores $\{C_i\}$ is considered. Beginning with the set of tasks from the first stage, tasks are placed one at a time onto the core with the earliest unoccupied core. in some embodiments, tasks from the subsequent stage do not begin placement until all tasks from the previous stage have been placed, and the order of stages of the input log is respected in the prediction. In the case that the subsequent stage has a dependency on a prior stage, then the earliest unoccupied time for all cores is set to the latest completion time of the tasks from the parent stage.

Figure 13:
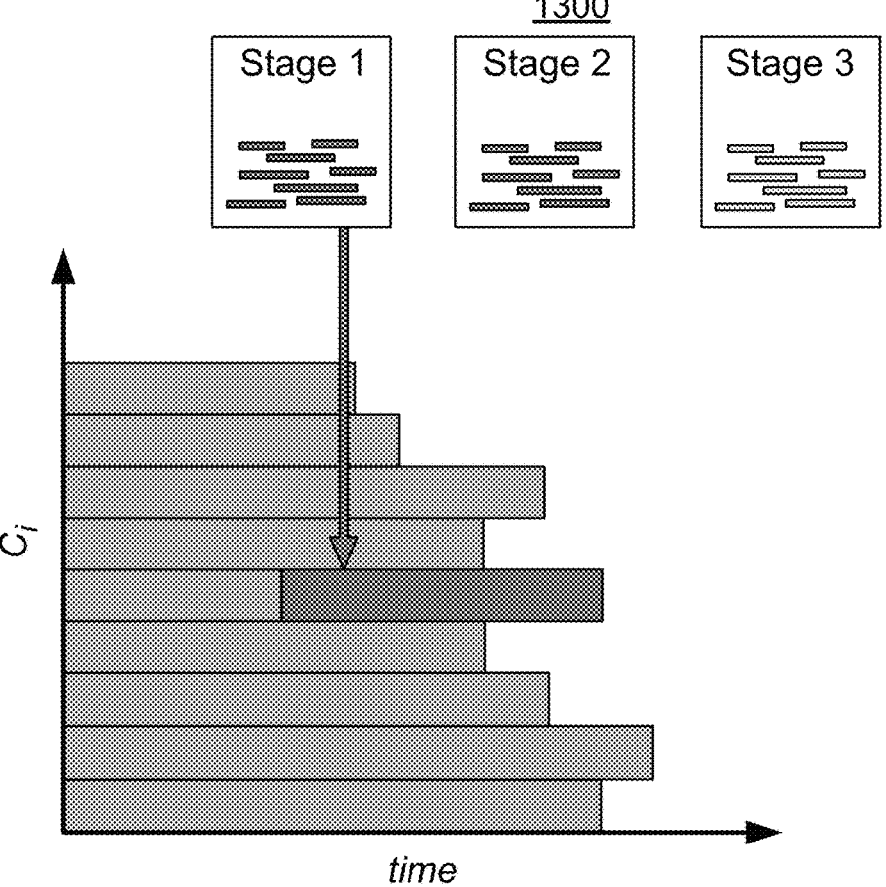
FIG. 13 depicts an embodiment of placement of tasks onto the cores having the earliest availability.

For example, FIG. 13 depicts an embodiment 1300 in which a task $t_i$ from the set of tasks $\{t_i\}$ in the earliest stage (stage 1) is placed onto the core $C_i$ with the earliest availability. In the embodiment shown, once all tasks from Stage 1 have been placed, tasks from stage 2 begin placement.

Once all tasks from all stages have been placed, the application runtime is predicted as the time from the application start (possibly prior to the placement of the first task) to the end of the last task. A significant benefit of this technique is that complexities such as task duration outliers, natural task duration variance, and task skew are organically accounted for by utilizing the input task distribution to predict the new task distribution. Furthermore, it is relatively simple to add or reduce the amount of variance to create more sophisticated models in the future.

Figure 14:
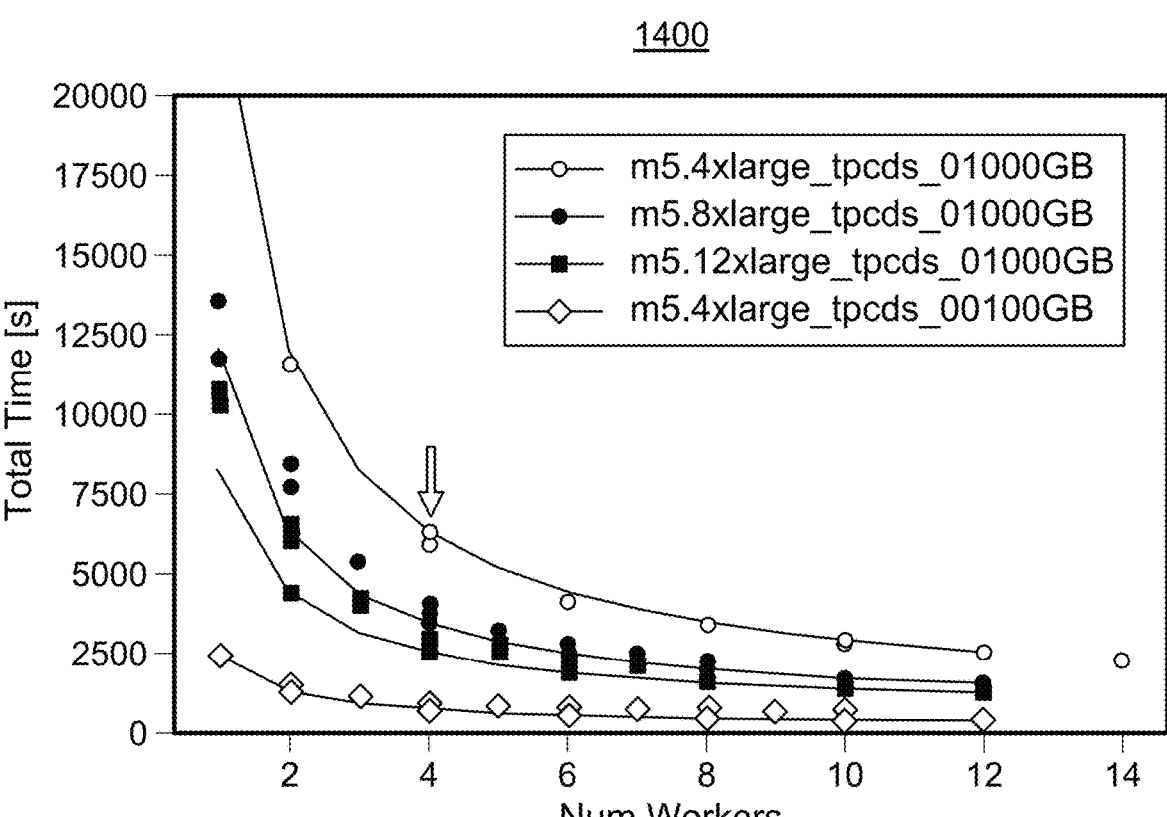
FIG. 14 depicts an embodiment of the prediction of total time versus number of cores.

A sample result using a 1 TB TPC-DS data set is depicted in FIG. 14, which plots an embodiment 1400 the total run time of all queries versus number of workers for four different hardware sets. The log file used for the predictions was from an m5.4×large run with four worker nodes (indicated by the black arrow) was input and predicted onto the other hardware sets. Predicted values are indicated with solid lines, while measured values are given by the markers. Both the measured and predicted run times are shown, as well as the percent error for each query.

In some SPARK™ applications there is the potential to reduce application runtime by reordering stage placement. To do so, stages may be prioritized and placed accordingly as part of method(s) 200, 300, 400, and/or 800. In particular, occasionally stages may be placed early during an application when the results from that stage are not needed until the final stage. In practice, it may be better to delay the placement of such a stage to work on higher-priority stages sooner. One technique for prioritizing stage placement would be to give each stage equal to the number of total steps, including branches, to the final sink of the application. Heuristically, this type of scoring gives higher priority to stages which have more future dependencies.

Figure 15:
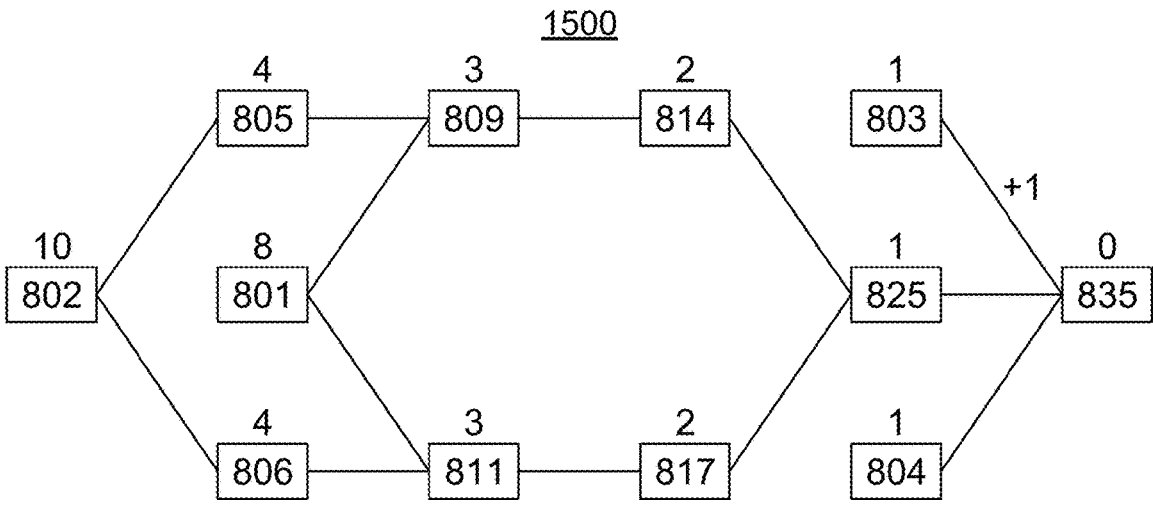
FIG. 15 depicts a tree diagram of an embodiment of the stage dependency.

FIG. 15 depicts a tree diagram of an embodiment of the stage dependency. The dependencies depicted in FIG. 15 may be form a query 30 of the TPC-DS benchmark. The stage-id is indicated with each box. The original stage placement was sequential (801, 802, 803, 804, 805, 809, 811, 817, 825, 835). The priority score given to each stage is indicated in above the corresponding box and is equal to the sum of the children's scores, plus the 1 for each connection to the children.

Figure 16A:
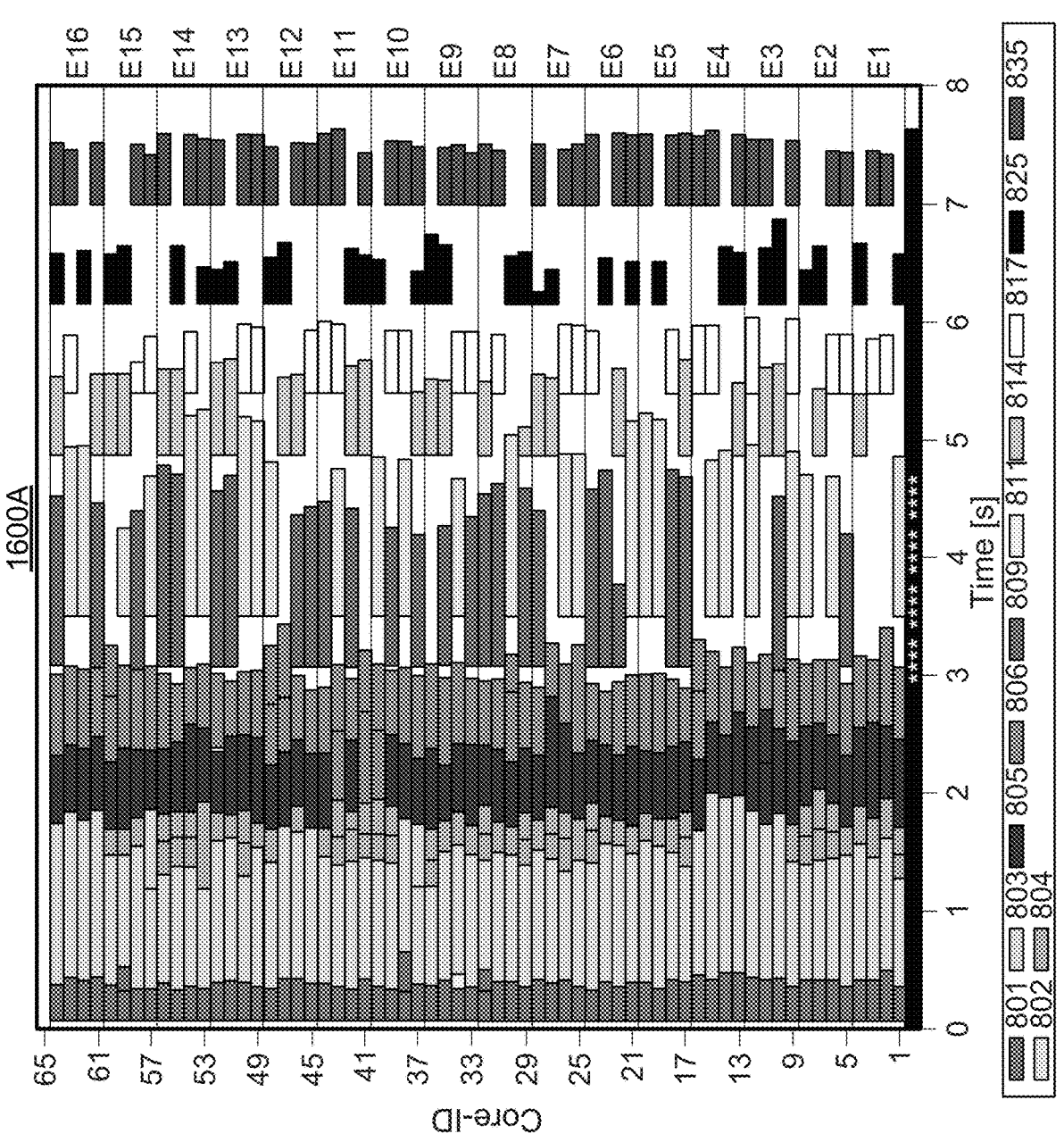
FIGS. 16A-16B depicts embodiments of the measured task placement with original stage ordering and after reordering stages according to descending priority score.
Figure 16B:
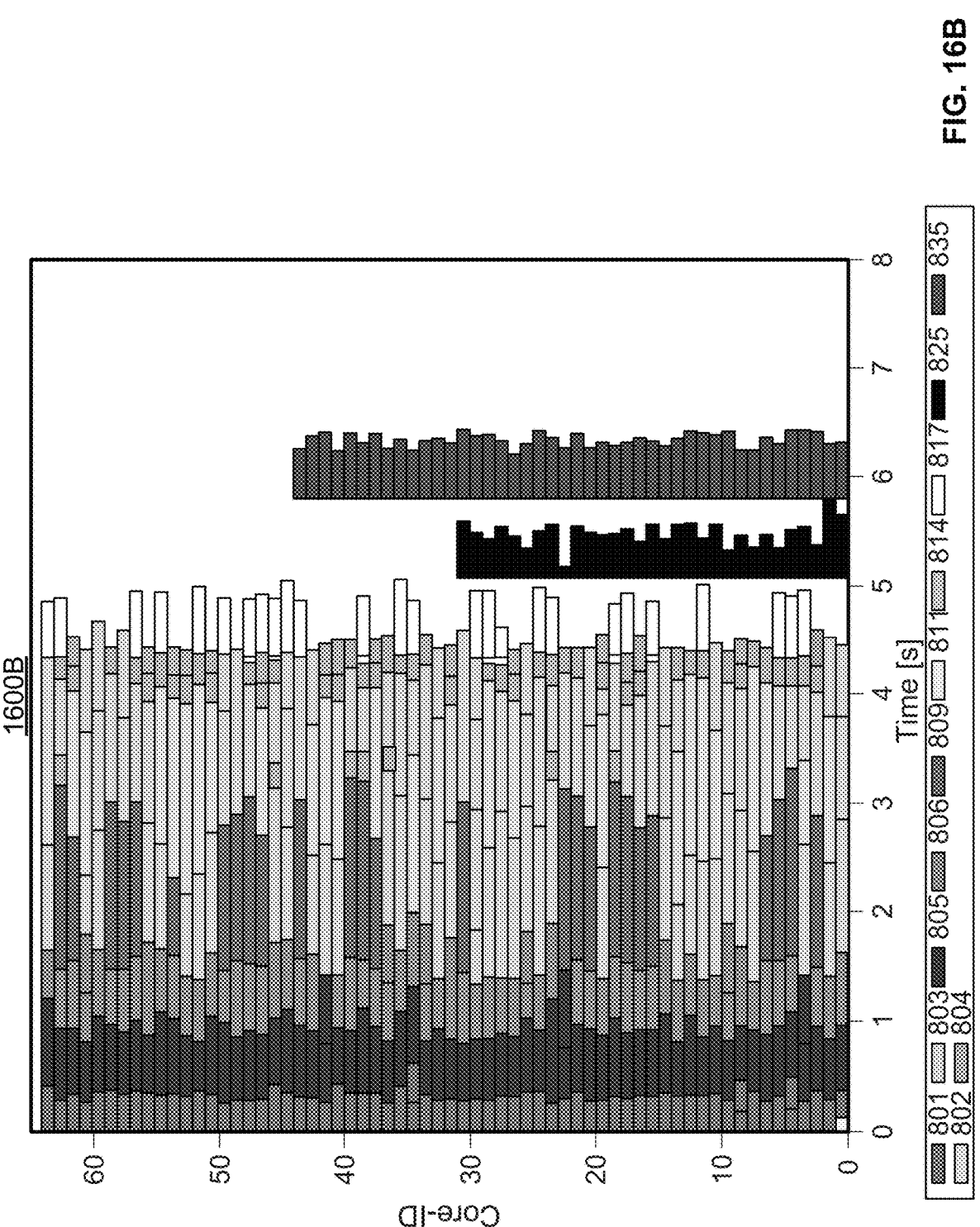

In the original ordering, stages 803 and 804 come early in the application. However, both stages are only dependencies of the final stage 835. Consequently, stages 803 and 804 are given low scores. Simulating this application with tasks placed according to descending stage score shows significant predicted improvement in run time (7.6 s to 6.5 s). FIGS. 16A and 16B depicts embodiments of the measured task placement with original stage ordering 1600A and after reordering stages 1600B according to descending priority score. As can be seen by a comparison of FIGS. 16A and 16H, task placement 1600B indicates that tasks may be more tightly packed and result in an improvement in run time.

A component of Java-based distributed computing frameworks is memory management and garbage collection. In these frameworks, memory does not need to be explicitly managed by the developer. Instead, it is automatically handled by the garbage collector. However, for the garbage collector to work more efficiently, there are a number of parameters to tune including which garbage collector to use (parallel, CMS, G1), when to initiate garbage collection (InitiatingOccupancyFraction), how to distribute the heap between different generations (NewRatio), among others. This results in the common practice of tuning garbage collection parameters for each individual application to avoid out of memory errors and use clusters effectively. Tuning garbage collection parameters can be expensive both in developer time and infrastructure cost due the high number of potential combinations of different parameters.

One way to avoid costly tuning experiments is to create a model of memory usage dependent on garbage collection parameters. Then, with collected data from a single run of an application, memory usage when using different garbage collection parameters can be predicted. By performing a simulation of memory usage, the user can avoid actually running the program multiple times.

Figures 17A, 17B:
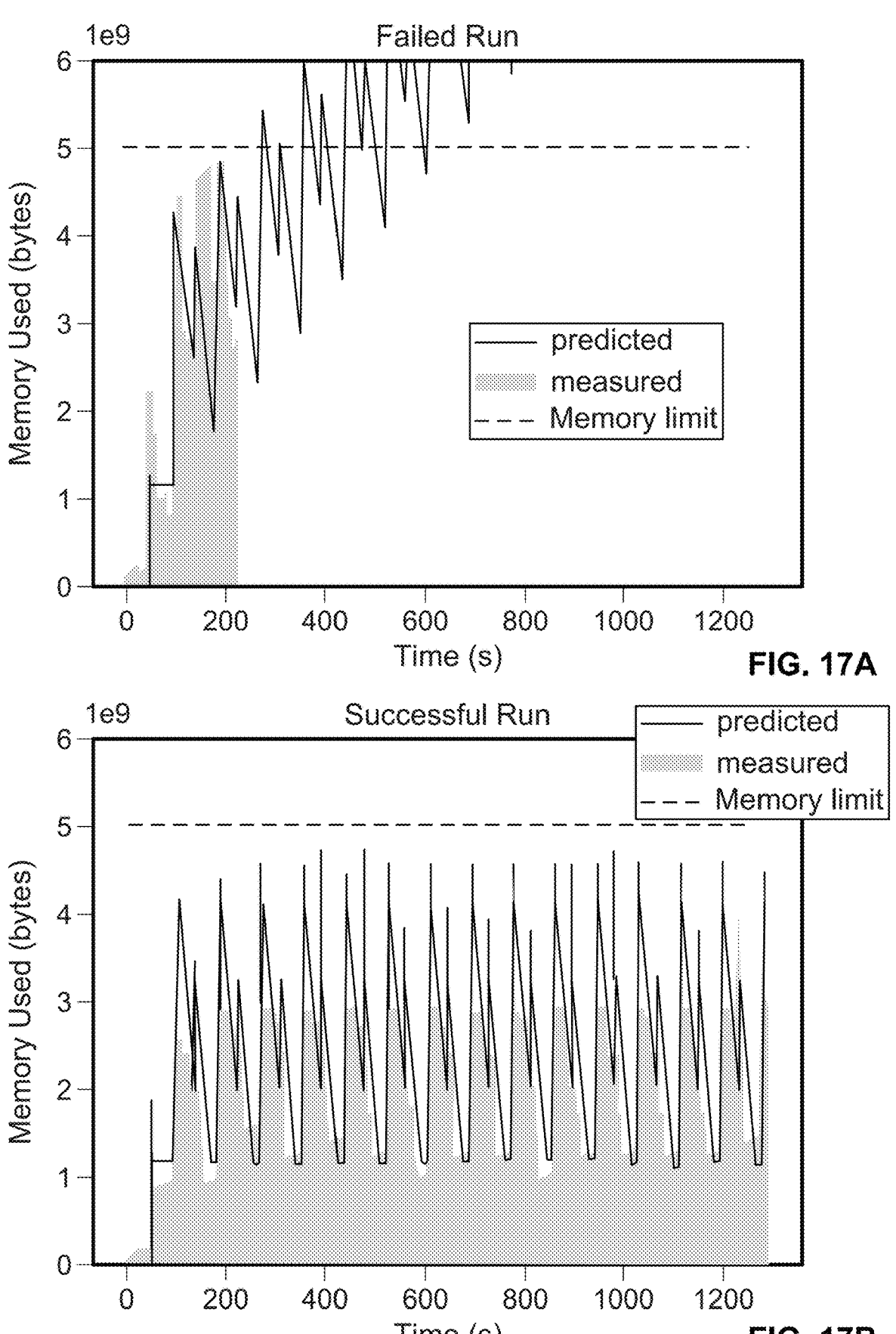
FIGS. 17A-17B depict embodiments of memory usage measured and predicted while running the same application with different garbage collection parameters.

Memory usage can be modeled by breaking down memory usage into two factors: allocation of memory for objects, and garbage collection of unused objects to free memory. At a high level, in order to avoid out of memory errors, the rate of memory allocation and the rate of garbage collection should be approximately equal. However, garbage collection is generally a responsive process. For example, garbage collection is typically triggered when certain conditions are met. Even if the average rate of garbage collection is the same as the average rate of memory allocation, out of memory errors can still occur. Therefore, modeling the memory usage across time, with the garbage collection as a responsive process, may improve performance. The change in memory usage at time t is the difference between memory allocated at time t and the memory freed from garbage collection at time t. Whether garbage collection is happening depends on the memory allocated and the garbage collection parameters. This can be expressed by the following equation:

$$\frac{dM \text{ usage}}{dt} = M_{allocated}(t, \text{ data size}) - M_{gc}(t, \text{ gc parameters}),$$

where $M_{usage}(t)$=the memory used at time t,
$M_{allocated}$(t, data size)=the memory allocated at time t for a given data size
$M_{gc}$(t, $M_{usage}$, gc parameters)=memory freed from garbage collection at time t,
which is a function of $M_{usage}$ and garbage collection parameters FIGS. 17A-17B depict embodiments of memory usage measured and predicted while running the same with different garbage collection parameters. In FIG. 17A (Failed Run), the garbage collection cannot catch up with memory allocation, the memory usage is unstable and continually growing, and the application fails. The measured memory usage in this case stops because the application failed. In FIG. 17B (Successful Run) with different garbage collection parameters, the memory usage is stable and under the memory limit. In both cases, the prediction captures the stability or instability of the memory usage as a function of the application and garbage collection parameters.

This model can be used to both accurately size the driver and workers of a distributed computing application, and also to pick the optimal garbage collection parameters to use.

In order to determine the predicted costs for an application using method(s) 200, 300, 400, and/or 800, costs may be modeled. The typical distributed cloud computing paradigm includes the temporary rental of computational resources, including "nodes" (virtual machines each associated with a fixed amount of virtual CPUs and RAM) each with some amount of fixed external memory storage (e.g. EBS storage on AWS™). The nodes are interconnected in a cluster, on which a user executes some application designed to utilize the distributed resources. The typical workflow using a cluster is as follows: spin-up cluster→load/install necessary applications→run applications→spin-down cluster. The cost of running such a workflow is the cost rate of the resources [$/hr] multiplied by the active time of the cluster [hr] consisting of the time between spin-up and spin-down. The cost can most simply be represented by:

$$C = t \sum_{i=1}^{N} \left[ P_i^{(node)} + M_i P_i^{(mem)} \right]$$

$C \equiv$ Cost of cluster [$]
$N \equiv$ Number of nodes in cluster
$t \equiv$ Cluster Runtime [hr]
$P_i^{(node)} \equiv$ Rate of $i^{th}$ node [$/hr]
$P_i^{(mem)} \equiv$ Rate of added memory to the $i^{th}$ node [$/GB/hr]
$M_i \equiv$ Volume of memory added to $i^{th}$ node [GB]

This model is valid for both heterogeneous clusters (multiple node types) and homogeneous clusters (mixed node types), and also allows for heterogeneity in the added memory.

When running SPARK™ applications using the YARN resource manager in client mode, the cluster has a single driver node which manages the application and distributes tasks, plus a number of worker nodes which do the computation. In this situation, it is common to utilize heterogeneous clusters, in which the workers are all the same node type while the driver is of a different node type with fewer resources. This split is performed because the driver is purchased as an on-demand instance so that it will not be removed during the application runtime. The workers, on the other hand, may be reserved as spot instances, which are much cheaper but may be removed at any time according to market demands. SPARK™ applications can recover from lost workers, but not from a lost driver. This split is possible because the driver requires much fewer resources than workers. With this cluster infrastructure, the cost may be written as:

$$C = t(N) \cdot P^{(dr)} + t(N) \cdot N \cdot (P^{(wrk)} + M \cdot P^{(mem)})$$

$C \equiv$ Cost of cluster [$]
$N \equiv$ Number of nodes in cluster
$t(N) \equiv$ Cluster Runtime [hr]
$P^{(wrk)} \equiv$ Rate of a worker node [$/hr]
$P^{(dr)} \equiv$ Rate of the driver node [$/GB/hr]
$P^{(mem)} \equiv$ Rate of added memory [$/GB/hr]
$M \equiv$ Volume of memory added per worker[GB]

Here it is assumed that the added storage is homogeneous and equal across all worker nodes, while the driver is given no additional storage. Note that the functional dependence of runtime on the number workers has been made explicit with t(N). Thus, costs may also be calculated for method(s) 200, 300, 400, and/or 800. Consequently, improved allocation of resources may still be achieved in such environments.

Figure 18:
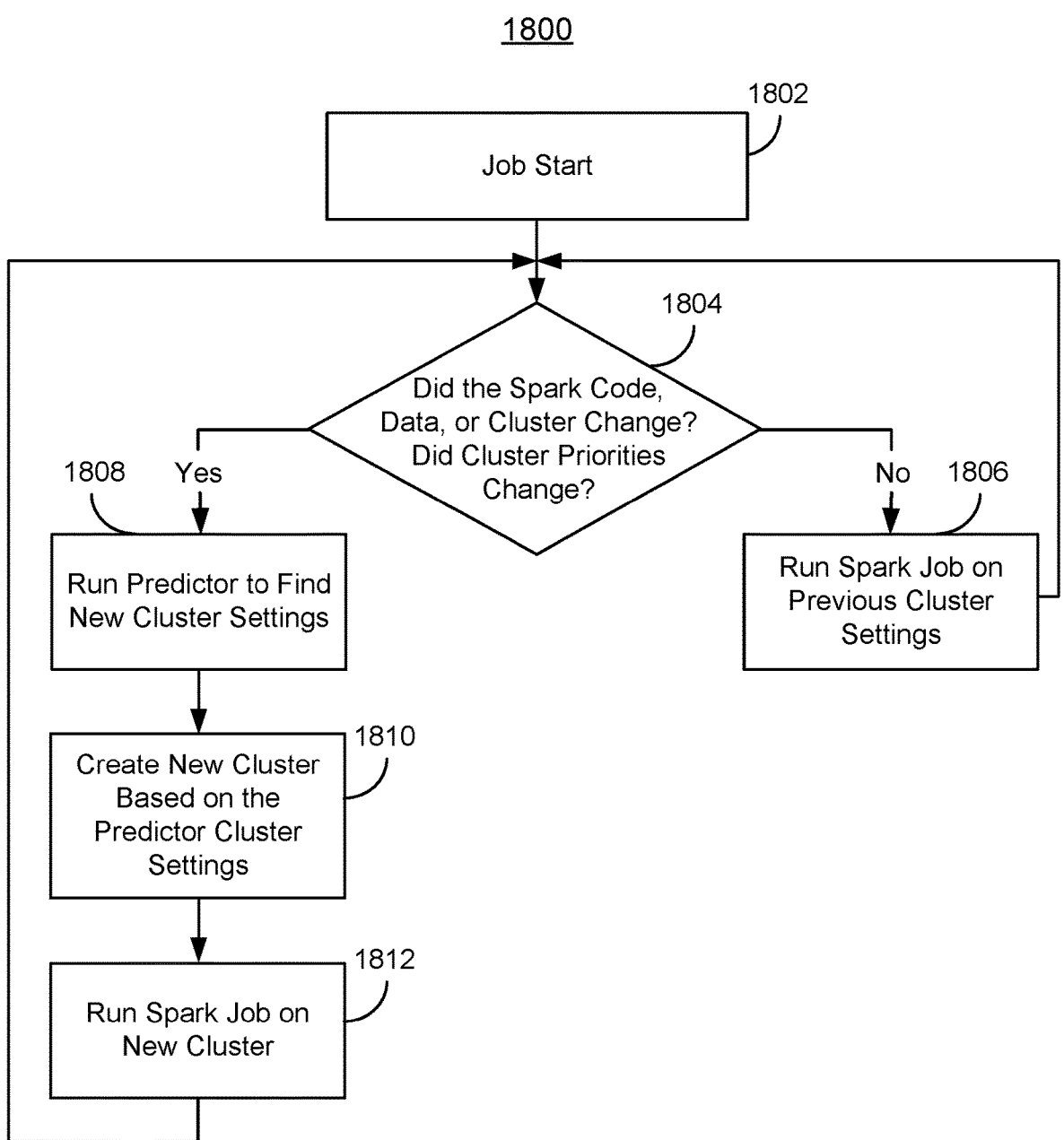
FIG. 18 is a flow-chart depicting an embodiment of a method for updating resources for an application.

FIG. 18 is a flow-chart depicting an embodiment of method 1800 for autoprovisioning (i.e. automatically allocating or reallocating) resources for an application. Method 1800 may be used with APACHE AIRFLOW™ and is described in the context of SPARK™. However, method 1800 may be used in other environments (e.g. AWS™ Glue) and with other platforms. Method 1800 is also described in the context of allocating resources for a single application. In some embodiments, costs for multiple applications may be determined. In such embodiments, interactions between applications that are to be processed at overlapping times may be considered by method 1800. Method 1800 may be used in conjunction with system 100 and/or methods 200, 300, 400 and/or 800. In other embodiments, method 1800 may be utilized with other systems and/or methods.

The job is considered to start at 1802. It is determined whether there has been a change for which allocation of resources for an application is to be updated, at 1804. In some embodiments, therefore, resources have already been allocated to the application. The cloud resources (e.g. the cores in the cluster) may have been allocated using scheduler 100 and/or method(s) 200, 300, 400, and/or 800 as described herein. In general, 1804 may be considered to identify whether a change to the cloud resources already allocated to the application, the application itself, or other features related to the application are such that a reallocation of resources may be desired. For example, the change may be a change to the application itself (e.g. a change in the SPARK™ code), a change in the data input to the application, a change within the cluster/cloud resources (e.g. a change to the cores in the cluster), a change in the cost and pricing of the cluster/cloud resources, and/or a change in the priorities of the cluster/cloud resources. Other changes resulting in a reallocation of resources are possible.

If it is determined that a change for which resources are to be reallocated has not occurred, then the application is run using the previous resources allocated, at 1806. Thus, the previous cluster settings may be used. In response to 1804 identifying the change for which resources should be reallocated, the predictor described herein is run, at 1808. Thus, new cluster settings (e.g. the number of cores) may be obtained. A new cluster is created based on these settings, at 1810. The application is run using the new cluster, at 1812.

Through method 1800, the predictor may be used to autoprovision resources as part of running an application. Thus, clusters may be automatically configured for optimal cost and/or performance as the code, data, and/or priorities change. Performance of the application and use of the cluster may, therefore, be improved.

Thus, using the methods and scheduler described herein, allocation of cloud resources may be improved both in the time taken to allocate resources and the optimization of resources allocated. In addition, scheduling may be improved at multiple levels. Inter-job dependencies may be monitored, workload precedence (e.g. in a multi-tenant cluster) may be better accounted for, and inter-job optimizations used. For example, all jobs may have resources allocated (including scheduling of tasks and stages) using the methods and system described herein. The reduction in run time may allow for additional jobs to utilize the cluster. Intra-job dependencies, skew, caching and optimization of the priorities of stages may be improved. Stage-level scheduling may be enhanced using the predicted run times for stages and the resource requirement knowledge obtained utilizing the log file(s). Task level scheduling may also be enhanced. For example, pairing of tasks in a stage with nodes executing the tasks may be optimized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
    extracting information from at least one log file for an application;
    determining an allocation of cloud resources for the application based on the information from the at least one log file, wherein the at least one log file is from at least one run of the application, wherein the determining of the allocation of cloud resources comprises:
        determining a total dead time for the at least one run;
        determining a total task time for the at least one run based on the information;

determining a predicted parallelism based on the information from the at least one log file, wherein the predicted parallelism relates to a distribution of tasks based on expected active cores;

determining a predicted total run time for the application based on the total task time, the total dead time, and the predicted parallelism; and determining a number of cores to be allocated for the application based on the predicted total run time; and providing the allocation of the cloud resources for the application to a hardware infrastructure.

2. The method of claim 1, wherein the extracting information from the at least one log file further includes:

obtaining at least one of task data, cloud settings, hardware information, cloud economic information or cloud reliability information.

3. The method of claim 1, wherein the determining the allocation of the cloud resources further includes:

determining a plurality of hardware infrastructures;

determining a predicted run time for each of the plurality of hardware infrastructures based on the information in the at least one log file.

4. The method of claim 3, wherein the determining the allocation of the cloud resources further includes:

determining a predicted cost for usage of each of the plurality of hardware infrastructures; and determining the predicted cost versus the predicted run time for each of the plurality of hardware infrastructures.

5. The method of claim 3, wherein the determining the total dead time and the total task time each include distributing the plurality of tasks over a plurality of cores in one hardware infrastructure of the plurality of hardware infrastructures.

6. The method of claim 1, wherein the determining the allocation of the cloud resources further includes:

creating a time-based model of memory usage including garbage collection parameters.

7. The method of claim 1, further comprising:

determining whether a change in an allocation of resources has occurred in at least one of an application, input data for the application, or cloud resources, the cloud resources including a cluster of cores assigned to the application; and in response to determining that the change has occurred, performing the extracting and determining.

8. The method of claim 1, wherein the determining the allocation of the cloud resources further includes:

determining a scheduling of tasks or stages for the application.

9. The method of claim 1, further comprising:

extracting additional information from at least one additional log file for the application; and determining a re-allocation of the cloud resources for the application based on the additional information from the at least one additional log file, the at least one additional log file corresponding to at least one additional run of the application, wherein the at least one additional run is different from the at least one run.

10. A system, comprising:

a processor configured to:

extract information from at least one log file for an application, wherein the at least one log file is from at least one run of the application;

determine an allocation of cloud resources for the application based on the information from the at least one log file, wherein the determining of the allocation of cloud resources comprises to:

determine a total dead time for the at least one run, wherein the at least one run includes a plurality of stages;

determine a total task time for the at least one run based on the information;

determine a predicted parallelism based on the information from the at least one log file, wherein the predicted parallelism relates to a distribution of tasks based on expected active cores;

determine a predicted total run time for the application based on the total task time, the total dead time, and the predicted parallelism; and determine a number of cores to be allocated for the application based on the predicted total run time; and provide the allocation of the cloud resources for the application to a hardware infrastructure; and a memory coupled to the processor and configured to provide the processor with instructions.

11. The system of claim 10, wherein to determine the allocation of the cloud resources, the processor is further configured to:

determine a plurality of hardware infrastructures;

determine a predicted run time for each of the plurality of hardware infrastructures based on the information in the at least one log file;

determine a predicted cost for usage of each of the plurality of hardware infrastructures; and determine the predicted cost versus the predicted run time for the plurality of hardware infrastructures.

12. The system of claim 11, wherein the determining the total dead time and the total task time each include distributing the plurality of tasks over a plurality of cores in one hardware infrastructure of the plurality of hardware infrastructures.

13. A computer program product embodied in a non-transitory computer readable medium and comprising computer instructions for:

extracting information from at least one log file for an application; and determining an allocation of cloud resources for the application based on the information from the at least one log file, wherein the at least one log file is from at least one run of the application, wherein the determining of the allocation of cloud resources comprises:

determining a total dead time for the at least one run, wherein the at least one run includes a plurality of stages;

determining a total task time for the at least one run based on the information;

determining a predicted parallelism based on the information from the at least one log file, wherein the predicted parallelism relates to a distribution of tasks based on expected active cores;

determining a predicted total run time for the application based on the total task time, the total dead time, and the predicted parallelism; and determining a number of cores to be allocated for the application based on the predicted total run time; and providing the allocation of the cloud resources for the application to a hardware infrastructure.

14. The computer program product of claim 13, wherein the computer instructions for determining the allocation of the cloud resources further include computer instructions for:

determining a plurality of hardware infrastructures;

determining a predicted run time for each of the plurality of hardware infrastructures based on the information in the at least one log file;

determining a predicted cost for usage of each of the plurality of hardware infrastructures; and determining the predicted cost versus the predicted run time for the plurality of hardware infrastructures.

15. The computer program product of claim 14, wherein the determining the total dead time and the total task time each include distributing the plurality of tasks over a plurality of cores in one hardware infrastructure of the plurality of hardware infrastructures.

16. The computer program product of claim 13, wherein the computer instructions for determining the allocation of the cloud resources further includes computer instructions for:

creating a time-based model of memory usage including garbage collection parameters.

17. The computer program product of claim 13, further comprising computer instructions for:

determining whether a change in an allocation of resources has occurred in at least one of an application, input data for the application, or cloud resources, the cloud resources including a cluster of cores assigned to the application; and in response to determining that the change has occurred, performing the extracting and determining.

\* \* \* \* \*